United States Patent
Gunnarsson et al.

(10) Patent No.: US 11,747,488 B2
(45) Date of Patent: Sep. 5, 2023

(54) METHODS FOR PROVISIONING OF REFERENCE STATION TRANSFER INFORMATION FOR GLOBAL NAVIGATION SATELLITE SYSTEM REAL TIME KINEMATICS

(71) Applicant: Telefonaktiebolaget LM Ericsson (publ), Stockholm (SE)

(72) Inventors: Fredrik Gunnarsson, Linköping (SE); Sara Modarres Razavi, Linköping (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 159 days.

(21) Appl. No.: 17/044,470

(22) PCT Filed: Apr. 4, 2019

(86) PCT No.: PCT/IB2019/052786
§ 371 (c)(1),
(2) Date: Oct. 1, 2020

(87) PCT Pub. No.: WO2019/193549
PCT Pub. Date: Oct. 10, 2019

(65) Prior Publication Data
US 2021/0141099 A1    May 13, 2021

Related U.S. Application Data

(60) Provisional application No. 62/653,323, filed on Apr. 5, 2018.

(51) Int. Cl.
*G01S 19/44* (2010.01)
*G01S 19/04* (2010.01)
(Continued)

(52) U.S. Cl.
CPC .............. *G01S 19/44* (2013.01); *G01S 19/04* (2013.01); *G01S 19/07* (2013.01); *H04W 64/003* (2013.01)

(58) Field of Classification Search
CPC .......... G01S 19/44; G01S 19/04; G01S 19/07; H04W 64/003
(Continued)

(56) References Cited

U.S. PATENT DOCUMENTS 7,586,438 B1 * 9/2009 Lawrence ............... G01S 5/009
                                                  701/445
8,624,779 B2 * 1/2014 Ferguson ................ G01S 19/04
                                                  342/357.58
(Continued)

FOREIGN PATENT DOCUMENTS

CN       103823228 A *  5/2014 ............. G01S 19/41
EP       2279427 B1 * 11/2017 ............. G01S 19/04
(Continued)

OTHER PUBLICATIONS

3GPP TS 29.171 V14.2.0; Technical Specification; 3rd Generation Partnership Project; Technical Specification Group Core Network and Terminals; Location Services (LCS); LCS Application Protocol (LCS-AP) between the Mobile Management Entity (MME) and Evolved Serving Mobile Location Centre (E-SMLC); SLs interface (Release 14)—Dec. 2017.
(Continued)

*Primary Examiner* — Harry K Liu
(74) *Attorney, Agent, or Firm* — BAKER BOTTS L.L.P.

(57) ABSTRACT

A method performed by a wireless device (110, 210, 410, 1200) is disclosed. The method comprises sending (801), to a network node (120, 115, 215, 220, 225, 460), a request for reference station transfer information. The method comprises obtaining (802) the reference station transfer infor-
(Continued)

mation for at least one pair of satellites (235, 240). The method comprises determining (803) an integer ambiguity solution associated with a new reference station (230B) based on the obtained reference station transfer information and an integer ambiguity solution associated with a current reference station (230A).

26 Claims, 13 Drawing Sheets

(51) Int. Cl.
*G01S 19/07* (2010.01)
*H04W 64/00* (2009.01)

(58) Field of Classification Search
USPC ..................................................... 342/357.27
See application file for complete search history.

(56) References Cited

U.S. PATENT DOCUMENTS

| | | | |
|---|---|---|---|
| 2010/0090890 | A1 | 4/2010 | Wirola et al. |
| 2016/0035096 | A1* | 2/2016 | Rudow ................... G01S 19/25 348/135 |
| 2017/0162048 | A1* | 6/2017 | Sugiura ................. G01S 5/0072 |
| 2017/0269224 | A1* | 9/2017 | Zhang ..................... G01S 19/44 |
| 2019/0025434 | A1 | 1/2019 | Takeda |

FOREIGN PATENT DOCUMENTS

| | | | | |
|---|---|---|---|---|
| KR | 2009 0071783 | A | 7/2009 | |
| WO | WO-2009130121 | A1 * | 10/2009 | ............. G01S 19/04 |
| WO | WO-2012151006 | A1 * | 11/2012 | ............. G01S 19/07 |
| WO | 2017 130513 | A1 | 8/2017 | |

OTHER PUBLICATIONS

3GPP TS 29.172 v.14.2.0; Technical Specification; 3rd Generation Partnership Project; Technical Specification Group Core Network and Terminals; Location Services (LCS); Evolved Packet Core (EPC) LCS Protocol (ELP) between the Gateway Mobile Location Centre (GMLC) and the Mobile Management Entity (MME); SLg interface (Release 14)—Mar. 2018.
3GPP TS 36.305 v14.3.0; Technical Specification; 3rd Generation Partnership Project; Technical Specification Group Radio Access Network; Evolved Universal Terrestrial Radio Access Network (E-UTRAN); Stage 2 functional specification of User Equipment (UE) positioning in E-UTRAN (Release 14)—Sep. 2017.
3GPP TS 36.331 v14.6.0; Technical Specification; 3rd Generation Partnership Project; Technical Specification Group Radio Access Network; Evolved Universal Terrestrial Radio Access (E-UTRA); Radio Resource Control (RRC); Protocol specification (Release 14)—Mar. 2018.
3GPP TS 36.355 v14.5.0; Technical Specification; 3rd Generation Partnership Project; Technical Specification Group Radio Access Network; Evolved Universal Terrestrial Radio Access (E-UTRA); LTE Positioning Protocol (LPP) (Release 14)—Mar. 2018.
3GPP TSG-RAN WG2#101bis; Sanya, China; Source: Ericsson; Title: Signaling of Multiple GNSS RTK Reference Stations and Associated Observations (Tdoc R2-1805258)—Apr. 16-20, 2018.
PCT International Search Report for International application No. PCT/IB2019/052786—dated Aug. 1, 2019.
PCT Written Opinion of the International Searching Authority issued for International application No. PCT/IB2019/052786—dated Aug. 1, 2019.
3GPP TSG-RAN WG2 Meeting #99; Berlin, Germany; Source: Qualcomm Incorporated; Title: Comparison of Options for RTK Support in 3GPP (R2-1708518)—Aug. 21-25, 2017.
3GPP TS 36.355 V14.5.1 (Apr. 2018); 3rd Generation Partnership Project; Technical Specification Group Radio Access Network; Evolved Universal Terrestrial Radio Access (E-UTRA); LTE Positioning Protocol (LPP) (Release 14).
3GPP TSG-RAN WG2 Meeting #101; Athens, Greece, Feb. 26-Mar. 2, 2018; Change Request; 36.355 CR Draft rev—Current version: 14.4.0; Title: Running LPP CR for RTK GNSS positioning (R2-1802690).
EPO Communication pursuant to Article 94(3) EPC issued for Application No. 19 722 690.5-1206—dated Mar. 27, 2023.
ETSI TS 136 455 v14.4.0 (Jan. 2018) LTE; Evolved Universal Terrestrial Radio Access (E-UTRA); LTE Positioning Protocol A (LPPa) (3GPP TS 36.455 version 14.4.0 Release 14).

* cited by examiner

METHODS FOR PROVISIONING OF REFERENCE STATION TRANSFER INFORMATION FOR GLOBAL NAVIGATION SATELLITE SYSTEM REAL TIME KINEMATICS

PRIORITY

This nonprovisional application is a U.S. National Stage Filing under 35 U.S.C. § 371 of International Patent Application Serial No. PCT/IB2019/052786 filed Apr. 4, 2019 and entitled "METHODS FOR PROVISIONING OF REFERENCE STATION TRANSFER INFORMATION FOR GLOBAL NAVIGATION SATELLITE SYSTEM REAL TIME KINEMATICS" which claims priority to U.S. Provisional Patent Application No. 62/653,323 filed Apr. 5, 2018 both of which are hereby incorporated by reference in their entirety.

TECHNICAL FIELD

The present disclosure relates, in general, to wireless communications and, more particularly, to methods for provisioning of reference station transfer information for global navigation satellite system real time kinematics.

BACKGROUND

FIG. 1 illustrates an example Long Term Evolution (LTE) positioning architecture 100. As illustrated in FIG. 1, positioning architecture 100 includes user equipment (UE) 110, evolved Node B (eNB) 115, Evolved-Serving Mobile Location Centre (E-SMLC) 120, Mobility Management Entity (MME) 125, and Gateway Mobile Location Centre (GMLC) 130. Positioning in LTE is supported by architecture 100 in FIG. 1, with direct interactions between UE 110 and a location server (e.g., E-SMLC 120 in FIG. 1) via the LTE Positioning Protocol (LPP) (defined in $3^{rd}$ Generation Partnership Project (3GPP) Technical Specification (TS) 36.355). The LTE architecture explicitly supports location services by defining E-SMLC 120, which is connected to the core network (e.g., MME 125) via the so-called Location Service-Application Protocol (LCS-AP) interface (defined in 3GPP TS 29.171), and GMLC 130, which is connected to MME 125 via the standardized Lg interface (defined in 3GPP TS 29.172). Additionally, there are also interactions between E-SMLC 120 and eNB 115 via the LPPa protocol (defined in 3GPP TS 36.455), to some extent supported by interactions between eNB 115 and UE 110 via the Radio Resource Control (RRC) protocol (defined in 3GPP TS 36.331).

The LTE system supports a number of positioning techniques (e.g., as described in 3GPP TS 36.305). These techniques include Enhanced Cell ID, Assisted Global Navigation Satellite System (GNSS), Observed Time Difference of Arrival (OTDOA) and Uplink Time Difference of Arrival (UTDOA).

The Enhanced Cell ID technique uses cell ID information to associate UE 110 to the serving area of a serving cell, and then additional information to determine a finer granularity position. Assisted GNSS uses GNSS information retrieved by UE 110, supported by assistance information provided to UE 110 from E-SMLC 120. When the OTDOA technique is used, UE 110 estimates the time difference of reference signals from different base stations (e.g., eNB 115) and sends the estimated time difference to E-SMLC 120 for multilateration. When the UTDOA technique is used, UE 110 is requested to transmit a specific waveform that is detected by multiple location measurement units (e.g., eNB 115) at known positions. These measurements are forwarded to E-SMLC 120 for multilateration.

One main objective of the LTE Release 15 positioning work item is to provide support for Real Time Kinematics (RTK) GNSS positioning. It has been agreed that both UE-based and UE-assisted GNSS RTK positioning would be supported. In UE-based GNSS RTK positioning, a UE obtains assistance data from a location server/network node to support positioning in the device. The assistance data is generated based on observations from one or more reference stations. A reference station is a node with known position and known antenna configuration and a GNSS receiver capable of measuring signals from one or more satellite systems. Satellite systems include one or more satellites, and each satellite transmits one or more signals.

FIG. 2 illustrates an example of a reference station network. In the example of FIG. 2, reference station network 200 includes a UE 210, a base station 215 (e.g., an eNB), a location server 220, a network RTK (NRTK) server 225, a plurality of reference stations 230A-C (reference station 230C is a virtual reference station), a first pair of satellites 235 (comprising satellites 235A and 235B), and a second pair of satellites 240 (comprising satellites 240A and 240B).

In operation, a served UE (e.g., UE 210) obtains observations from one or more physical or non-physical reference stations (e.g., reference stations 230A-C). NRTK server 225 gathers all observations (e.g., from UE 210 and/or other UEs) and may interpolate to generate calculated observations at non-physical reference station positions.

In the example of FIG. 2, UE 210 is moving within the service area away from reference station 230A (the current reference station for UE 210). As UE 210 moves in the service area, current reference station 230A becomes distant and a new reference station (e.g., reference station 230B) can become more attractive.

FIG. 3 illustrates a comparison of the carrier-phase and code measurements of satellite signals. As can be observed from FIG. 3, carrier frequency 305 is very uniform. As a result of this uniformity, carrier frequency 305 is hard to count, because every cycle looks the same. Pseudo random code 310, on the other hand, is intentionally complex to make it easier to distinguish. The carrier phase measurements of a receiver are very accurate, but the number of integer wavelengths to the satellite is unknown. However, based on assistance data with observations, a UE can determine the integer. Then, the UE obtains observations, associated to one or more reference stations, and the UE uses the observations.

From Navpedia, we have the following description of the phase measurement, the integer ambiguity N, and the error contributions:

$$\phi = \rho - I + T_r + c(b_{Rx} - b_{Sat}) + N\lambda + \varepsilon_\phi \qquad (1)$$

where:
I is the signal path delay due to the ionosphere;
$T_T$ is the signal path delay due to the troposphere;
$b_{Rx}$ is the receiver clock offset from the reference (GPS) time;
$b_{Sat}$ is the satellite clock offset from the reference (GPS) time;
c is the vacuum speed of light;
λ is the carrier nominal wavelength;
N is the ambiguity of the carrier-phase (integer number);
$\varepsilon_\phi$ are the measurement noise components, including multipath and other effects;

ρ is the geometrical range between the satellite and the receiver, computed as a function of the satellite ($x_{Sat}$, $y_{Sat}$, $z_{Sat}$) and receiver ($x_{Rx}$, $y_{Rx}$, $z_{Rx}$) coordinates as:

$$\rho = \sqrt{(x_{Sat}-x_{Rx})^2 + (y_{Sat}-y_{Rx})^2 + (z_{Sat}-z_{Rx})^2} \quad (2)$$

Receivers then form the double difference equation.

For two receivers a and b making simultaneous measurements at the same nominal time to satellites 1 and 2, the double difference observable is:

$$\phi_a^{12} - \phi_b^{12} = \rho_a^{12} - \rho_b^{12} - I_a^{12} + I_b^{12} + Tr_a^{12} - Tr_b^{12} + \lambda(N_a^{12} - N_b^{12}) + \varepsilon_a^{12} - \varepsilon_b^{12} \quad (3)$$

where:

$$\varnothing_a^{12} = \varnothing_a^1 - \varnothing_a^2 \quad (4)$$

In practice, 1 and 2 represent two different satellites, a is the UE, and b is a reference station. With this double difference, several error terms cancel out, and the UE can compute the unknown integer $N_{ab}^{12} = N_a^{12} - N_b^{12}$. This process is tedious and takes significant initialization time. As described above, when the UE moves in the service area, the current reference station (e.g., reference station 230A described above in relation to FIG. 2) becomes distant, while a new reference station (e.g., reference station 230B described above in relation to FIG. 2) can become more attractive. In such a scenario, the UE needs to reinitialize the integer ambiguity solution with the new reference station instead.

There currently exist certain challenge(s). When changing reference station, the initialization is time consuming and results in a period of poor accuracy. One possible alternative is to send observations associated to several reference stations to the UE, and the UE can initialize a new reference station before a current reference station becomes too distant. This approach, however, multiplies the signaling costs of sending the observations, which is undesirable.

SUMMARY

To address the foregoing problems with existing solutions, disclosed is a method performed by a wireless device. The method comprises sending, to a network node, a request for reference station transfer information. The method comprises obtaining the reference station transfer information for at least one pair of satellites. The method comprises determining an integer ambiguity solution associated with a new reference station based on the obtained reference station transfer information and an integer ambiguity solution associated with a current reference station.

In certain embodiments, the method may further comprise estimating a position of the wireless device based on the integer ambiguity solution associated with the new reference station and one or more carrier phase observations from the new reference station.

In certain embodiments, the method may further comprise sending capability information to the network node, the capability information indicating a capability of the wireless device to use reference station transfer information.

In certain embodiments, the request for reference station transfer information may comprise an identifier of the current reference station. In certain embodiments, the request for reference station transfer information may comprise an identifier of the new reference station.

In certain embodiments, the request for reference station transfer information may be sent in response to a determination that the wireless device needs to change from the current reference station to the new reference station. In certain embodiments, the request for reference station transfer information may be included in a GNSS-RTK-ObservationsReq information element.

In certain embodiments, the obtained reference station transfer information may comprise reference station transfer information for a first satellite signal of a first satellite in the satellite pair, and reference station transfer information for a second satellite signal of a second satellite in the satellite pair. In certain embodiments, the obtained reference station transfer information may comprise reference station transfer information for one or more global navigation satellite systems. In certain embodiments, the obtained reference station transfer information may comprise a double difference of the integer ambiguity solution associated with the current reference station and the integer ambiguity solution associated with the new reference station. In certain embodiments, the reference station transfer information may be obtained from a GNSS-RTK-RStransferInfo information element.

In certain embodiments, the network node may comprise a location server. In certain embodiments, one or more of the current reference station and the new reference station may be a virtual reference station.

Also disclosed is a wireless device. The wireless device comprises a receiver, a transmitter, and processing circuitry coupled to the receiver and the transmitter. The processing circuitry is configured to send, to a network node, a request for reference station transfer information. The processing circuitry is configured to obtain the reference station transfer information for at least one pair of satellites. The processing circuitry is configured to determine an integer ambiguity solution associated with a new reference station based on the obtained reference station transfer information and an integer ambiguity solution associated with a current reference station.

Also disclosed is a computer program, the computer program comprising instructions configured to perform a method. The method comprises sending, to a network node, a request for reference station transfer information. The method comprises obtaining the reference station transfer information for at least one pair of satellites. The method comprises determining an integer ambiguity solution associated with a new reference station based on the obtained reference station transfer information and an integer ambiguity solution associated with a current reference station.

Also disclosed is a computer program product comprising a computer program, the computer program comprising instructions which when executed on a computer perform a method. The method comprises sending, to a network node, a request for reference station transfer information. The method comprises obtaining the reference station transfer information for at least one pair of satellites. The method comprises determining an integer ambiguity solution associated with a new reference station based on the obtained reference station transfer information and an integer ambiguity solution associated with a current reference station.

Also disclosed is a non-transitory computer-readable storage medium comprising a computer program, the computer program comprising instruction which when executed on a computer perform a method. The method comprises sending, to a network node, a request for reference station transfer information. The method comprises obtaining the reference station transfer information for at least one pair of satellites. The method comprises determining an integer ambiguity solution associated with a new reference station based on the obtained reference station transfer information and an integer ambiguity solution associated with a current reference station.

Also disclosed is a method performed by a network node. The method comprises determining reference station transfer information for at least one pair of satellites associated with a current reference station of a wireless device and a new reference station of the wireless device. The method comprises sending the determined reference station transfer information to the wireless device.

In certain embodiments, the method may further comprise receiving a request for the reference station transfer information from the wireless device. The reference station transfer information may be determined in response to the request. In certain embodiments, the request for the reference station transfer information may comprise an identifier of the current reference station. In certain embodiments, the request for the reference station transfer information may comprise an identifier of the new reference station. In certain embodiments, the request for the reference station transfer information may be included in a GNSS-RTK-ObservationsReq information element.

In certain embodiments, the method may further comprise receiving capability information for the wireless device, the capability information indicating a capability of the wireless device to use reference station transfer information.

In certain embodiments, the reference station transfer information may comprise reference station transfer information for a first satellite signal of a first satellite in the satellite pair, and reference station transfer information for a second satellite signal of a second satellite in the satellite pair. In certain embodiments, the reference station transfer information may comprise reference station transfer information for one or more global navigation satellite systems. In certain embodiments, the reference station transfer information may comprise a double difference of an integer ambiguity solution associated with the current reference station and an integer ambiguity solution associated with the new reference station.

In certain embodiments, the reference station transfer information may enable the wireless device to: determine the integer ambiguity solution associated with the new reference station based on the reference station transfer information and the integer ambiguity solution associated with the current reference station; and estimate a position of the wireless device based on the integer ambiguity solution associated with the new reference station and one or more carrier phase observations from the new reference station.

In certain embodiments, the reference station transfer information may be sent in a GNSS-RTK-RStransferInfo information element.

In certain embodiments, the network node may comprise a location server. In certain embodiments, one or more of the current reference station and the new reference station may be a virtual reference station.

Also disclosed is a network node. The network node comprises a receiver, a transmitter, and processing circuitry coupled to the receiver and the transmitter. The processing circuitry is configured to determine reference station transfer information for at least one pair of satellites associated with a current reference station of a wireless device and a new reference station of the wireless device. The processing circuitry is configured to send the determined reference station transfer information to the wireless device.

Also disclosed is a computer program, the computer program comprising instructions configured to perform a method. The method comprises determining reference station transfer information for at least one pair of satellites associated with a current reference station of a wireless device and a new reference station of the wireless device. The method comprises sending the determined reference station transfer information to the wireless device.

Also disclosed is a computer program product comprising a computer program, the computer program comprising instructions which when executed on a computer perform a method. The method comprises determining reference station transfer information for at least one pair of satellites associated with a current reference station of a wireless device and a new reference station of the wireless device. The method comprises sending the determined reference station transfer information to the wireless device.

Also disclosed is a non-transitory computer-readable storage medium comprising a computer program, the computer program comprising instruction which when executed on a computer perform a method. The method comprises determining reference station transfer information for at least one pair of satellites associated with a current reference station of a wireless device and a new reference station of the wireless device. The method comprises sending the determined reference station transfer information to the wireless device.

Certain embodiments of the present disclosure may provide one or more technical advantages. As one example, certain embodiments may, with very limited signaling, enable the wireless device to transfer its integer ambiguity solution from a current reference station to a new reference station. As another example, certain embodiments may advantageously enable the wireless device to move from one reference station to a new reference station more quickly. Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1:
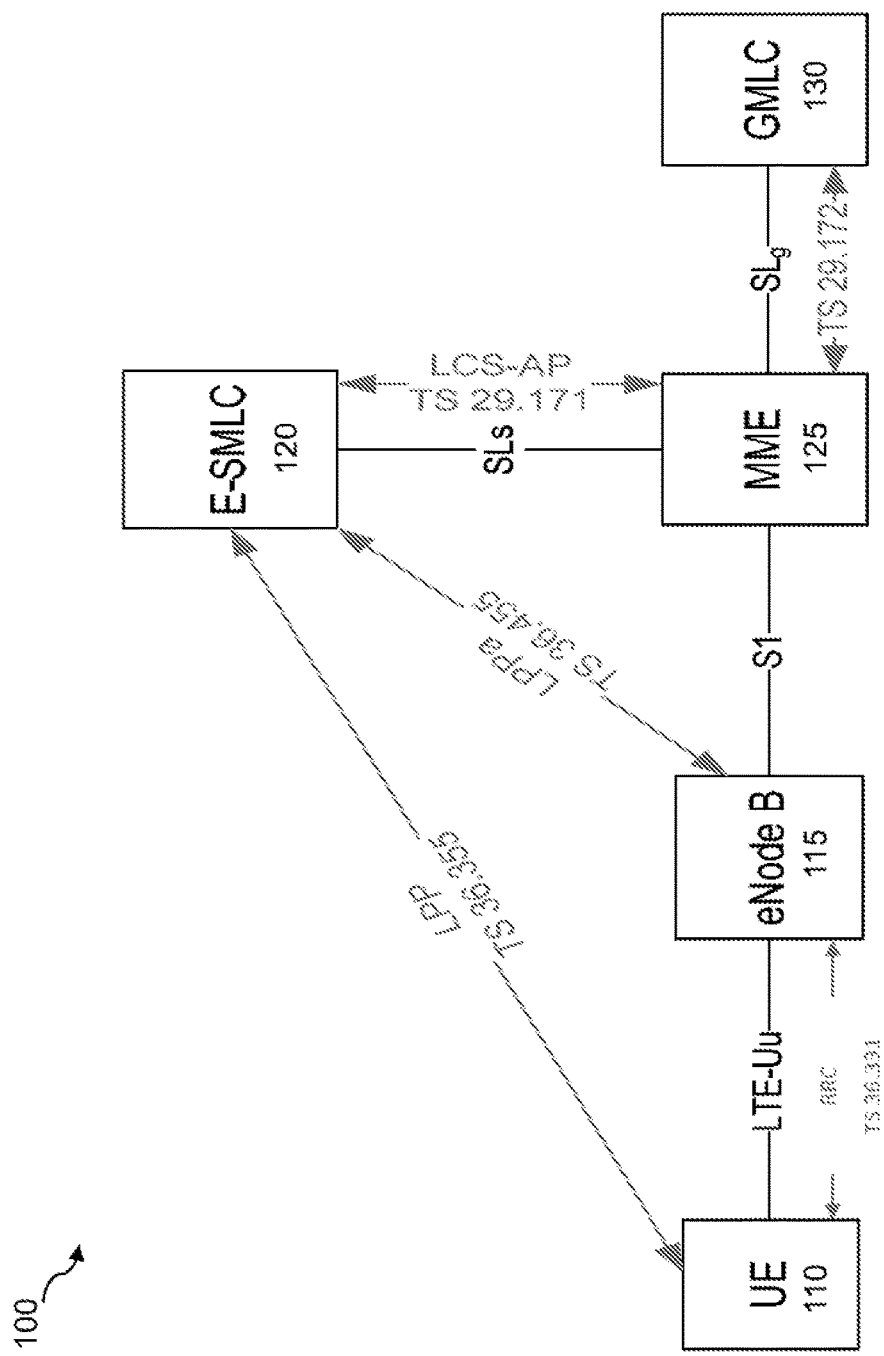
FIG. 1 illustrates an example LTE positioning architecture.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

As described above, when a wireless device (e.g., a UE) moves within a service area, a current reference station of the UE may become more distant while a new reference station becomes more attractive. In such a scenario, the UE needs to reinitialize the integer ambiguity solution with the new reference station. This process is tedious and takes significant initialization time. In addition to being time consuming, the initialization when changing reference stations results in a period of poor accuracy. One alternative is to send observations associated to several reference stations to the UE, so that the UE can initialize a new reference station before a current reference station becomes too distant. Such an approach, however, multiplies the signaling costs of the observables and hence is not a viable option.

The present disclosure contemplates various embodiments that may address these and other deficiencies associated with existing approaches. For example, certain embodiments disclose a signaling framework for request for, and provisioning of, reference station transfer information. The approaches described herein advantageously facilitate a quick transfer of the integer ambiguity solution when the UE is moving from a current reference station to a new reference station.

According to one example embodiment, a method performed by a wireless device (e.g., a UE) is disclosed. The wireless device sends, to a network node (e.g., a location server such as an E-SMLC), a request for reference station transfer information. The wireless device obtains the reference station transfer information for at least one pair of satellites. The wireless device determines an integer ambiguity solution associated with a new reference station based on the obtained reference station transfer information and an integer ambiguity solution associated with a current reference station.

In certain embodiments, the request may be sent in response to a determination that the wireless device needs to change from the current reference station to the new reference station. In certain embodiments, the obtained reference station transfer information may include a double difference of the integer ambiguity solution associated with the current reference station and the integer ambiguity solution associated with the new reference station. In certain embodiments, the wireless device estimates a position of the wireless device based on the integer ambiguity solution associated with the new reference station and one or more carrier phase observations from the new reference station.

According to another example embodiment, a method performed by a network node (e.g., a location server, such as an E-SMLC) is disclosed. The network node determines reference station transfer information for at least one pair of satellites associated with a current reference station of a wireless device (e.g., a UE) and a new reference station of the wireless device. The network node sends the determined reference station transfer information to the wireless device.

In certain embodiments, the network node receives a request for the reference station transfer information from the wireless device, and determines the reference station transfer information in response to the request. In certain embodiments, the request for the reference station transfer information may include one or more of an identifier of the current reference station; and an identifier of the new reference station. In certain embodiments, the reference station transfer information may include a double difference of an integer ambiguity solution associated with the current reference station and an integer ambiguity solution associated with the new reference station. The reference station transfer information may advantageously enable the wireless device to determine the integer ambiguity solution associated with the new reference station based on the reference station transfer information and the integer ambiguity solution associated with the current reference station and estimate a position of the wireless device based on the integer ambiguity solution associated with the new reference station and one or more carrier phase observations from the new reference station.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 4:
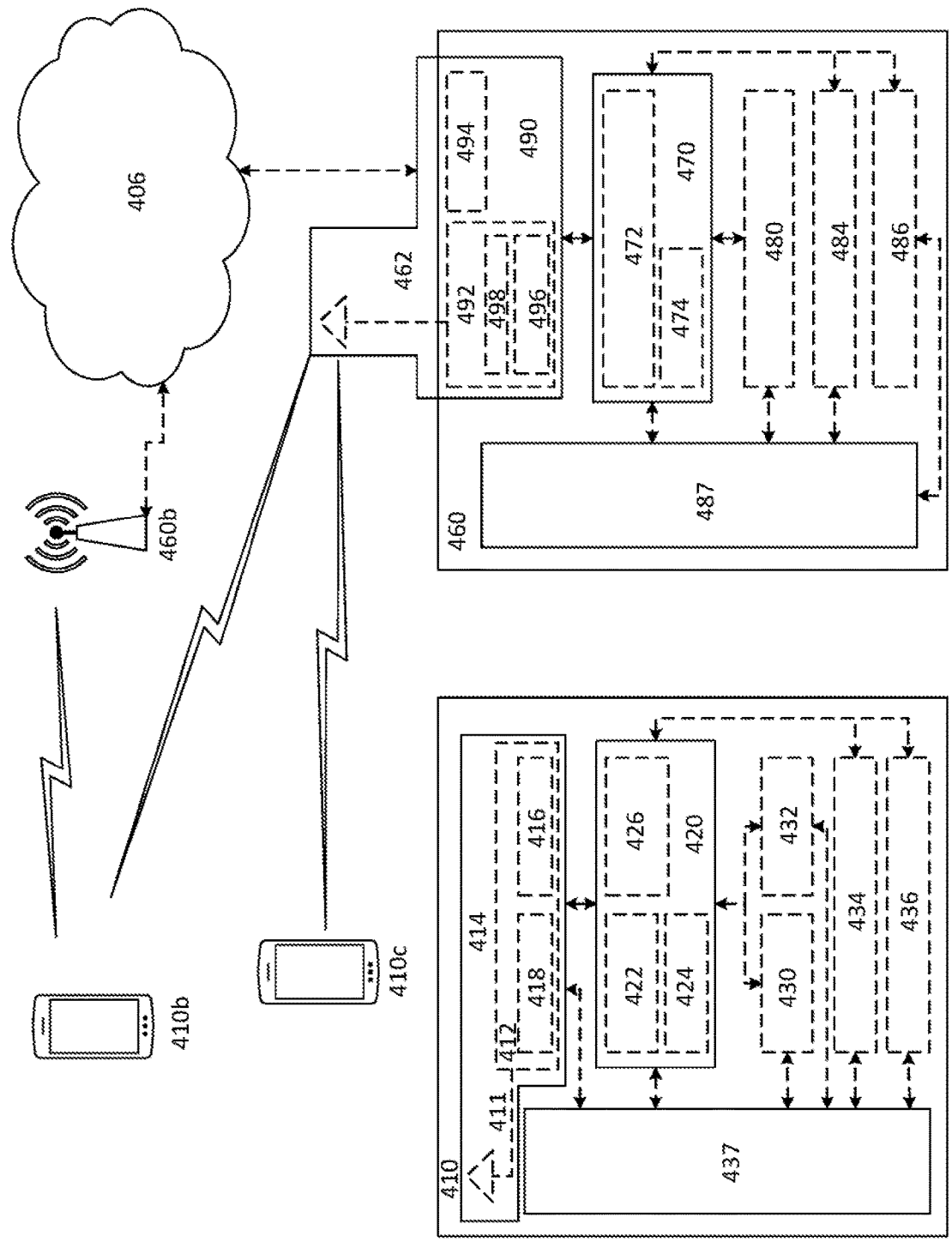
FIG. 4 illustrates an example wireless communications network, in accordance with certain embodiments.

FIG. 4 illustrates an example wireless communications network, in accordance with certain embodiments. Although the subject matter described herein may be implemented in any appropriate type of system using any suitable components, the embodiments disclosed herein are described in relation to a wireless network, such as the example wireless network illustrated in FIG. 4. For simplicity, the wireless network of FIG. 4 only depicts network 406, network nodes 460 and 460b, and WDs 410, 410b, and 410c. In practice, a wireless network may further include any additional elements suitable to support communication between wireless devices or between a wireless device and another communication device, such as a landline telephone, a service provider, or any other network node or end device. Of the illustrated components, network node 460 and wireless device (WD) 410 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 406 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 460 and WD 410 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes/location servers (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 4, network node 460 includes processing circuitry 470, device readable medium 480, interface 490, auxiliary equipment 484, power source 486, power circuitry 487, and antenna 462. Although network node 460 illustrated in the example wireless network of FIG. 4 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 460 are depicted as single boxes located within a larger box, or nested within multiple boxes, in practice, a network node may comprise multiple different physical components that make up a single illustrated component (e.g., device readable medium 480 may comprise multiple separate hard drives as well as multiple RAM modules).

Similarly, network node 460 may be composed of multiple physically separate components (e.g., a NodeB component and a RNC component, or a BTS component and a BSC component, etc.), which may each have their own respective components. In certain scenarios in which network node 460 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 460 may be configured to support multiple radio access technologies (RATs). In such embodiments, some components may be duplicated (e.g., separate device readable medium 480 for the different RATs) and some components may be reused (e.g., the same antenna 462 may be shared by the RATs). Network node 460 may also include multiple sets of the various illustrated components for different wireless technologies integrated into network node 460, such as, for example, GSM, WCDMA, LTE, NR, WiFi, or Bluetooth wireless technologies. These wireless technologies may be integrated into the same or different chip or set of chips and other components within network node 460.

Processing circuitry 470 is configured to perform any determining, calculating, or similar operations (e.g., certain obtaining operations) described herein as being provided by a network node. These operations performed by processing circuitry 470 may include processing information obtained by processing circuitry 470 by, for example, converting the obtained information into other information, comparing the obtained information or converted information to information stored in the network node, and/or performing one or more operations based on the obtained information or converted information, and as a result of said processing making a determination.

Processing circuitry 470 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 460 components, such as device readable medium 480, network node 460 functionality. For example, processing circuitry 470 may execute instructions stored in device readable medium 480 or in memory within processing circuitry 470. Such functionality may include providing any of the various wireless features, functions, or benefits discussed herein. In some embodiments, processing circuitry 470 may include a system on a chip (SOC).

In some embodiments, processing circuitry 470 may include one or more of radio frequency (RF) transceiver circuitry 472 and baseband processing circuitry 474. In some embodiments, radio frequency (RF) transceiver circuitry 472 and baseband processing circuitry 474 may be on separate chips (or sets of chips), boards, or units, such as radio units and digital units. In alternative embodiments, part or all of RF transceiver circuitry 472 and baseband processing circuitry 474 may be on the same chip or set of chips, boards, or units In certain embodiments, some or all of the functionality described herein as being provided by a network node, base station, eNB or other such network device may be performed by processing circuitry 470 executing instructions stored on device readable medium 480 or memory within processing circuitry 470. In alternative embodiments, some or all of the functionality may be provided by processing circuitry 470 without executing instructions stored on a separate or discrete device readable medium, such as in a hard-wired manner. In any of those embodiments, whether executing instructions stored on a device readable storage medium or not, processing circuitry 470 can be configured to perform the described functionality. The benefits provided by such functionality are not limited to processing circuitry 470 alone or to other components of network node 460, but are enjoyed by network node 460 as a whole, and/or by end users and the wireless network generally.

Device readable medium 480 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 470. Device readable medium 480 may store any suitable instructions, data or information, including a computer program, software, an application including one or more of logic, rules, code, tables, etc. and/or other instructions capable of being executed by processing circuitry 470 and, utilized by network node 460. Device readable medium 480 may be used to store any calculations made by processing circuitry 470 and/or any data received via interface 490. In some embodiments, processing circuitry 470 and device readable medium 480 may be considered to be integrated.

Interface 490 is used in the wired or wireless communication of signalling and/or data between network node 460, network 406, and/or WDs 410. As illustrated, interface 490 comprises port(s)/terminal(s) 494 to send and receive data, for example to and from network 406 over a wired connection. Interface 490 also includes radio front end circuitry 492 that may be coupled to, or in certain embodiments a part of, antenna 462. Radio front end circuitry 492 comprises filters 498 and amplifiers 496. Radio front end circuitry 492 may be connected to antenna 462 and processing circuitry 470. Radio front end circuitry may be configured to condition signals communicated between antenna 462 and processing circuitry 470. Radio front end circuitry 492 may receive digital data that is to be sent out to other network nodes or WDs via a wireless connection. Radio front end circuitry 492 may convert the digital data into a radio signal having the appropriate channel and bandwidth parameters using a combination of filters 498 and/or amplifiers 496. The radio signal may then be transmitted via antenna 462. Similarly, when receiving data, antenna 462 may collect radio signals which are then converted into digital data by radio front end circuitry 492. The digital data may be passed to processing circuitry 470. In other embodiments, the interface may comprise different components and/or different combinations of components.

In certain alternative embodiments, network node 460 may not include separate radio front end circuitry 492, instead, processing circuitry 470 may comprise radio front end circuitry and may be connected to antenna 462 without separate radio front end circuitry 492. Similarly, in some embodiments, all or some of RF transceiver circuitry 472 may be considered a part of interface 490. In still other embodiments, interface 490 may include one or more ports or terminals 494, radio front end circuitry 492, and RF transceiver circuitry 472, as part of a radio unit (not shown), and interface 490 may communicate with baseband processing circuitry 474, which is part of a digital unit (not shown).

Antenna 462 may include one or more antennas, or antenna arrays, configured to send and/or receive wireless signals. Antenna 462 may be coupled to radio front end circuitry 490 and may be any type of antenna capable of transmitting and receiving data and/or signals wirelessly. In some embodiments, antenna 462 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 462 may be separate from network node 460 and may be connectable to network node 460 through an interface or port.

Antenna 462, interface 490, and/or processing circuitry 470 may be configured to perform any receiving operations and/or certain obtaining operations described herein as being performed by a network node. Any information, data and/or signals may be received from a wireless device, another network node and/or any other network equipment. Similarly, antenna 462, interface 490, and/or processing circuitry 470 may be configured to perform any transmitting operations described herein as being performed by a network node. Any information, data and/or signals may be transmitted to a wireless device, another network node and/or any other network equipment.

Power circuitry 487 may comprise, or be coupled to, power management circuitry and is configured to supply the components of network node 460 with power for performing the functionality described herein. Power circuitry 487 may receive power from power source 486. Power source 486 and/or power circuitry 487 may be configured to provide power to the various components of network node 460 in a form suitable for the respective components (e.g., at a voltage and current level needed for each respective component). Power source 486 may either be included in, or external to, power circuitry 487 and/or network node 460. For example, network node 460 may be connectable to an external power source (e.g., an electricity outlet) via an input circuitry or interface such as an electrical cable, whereby the external power source supplies power to power circuitry 487. As a further example, power source 486 may comprise a source of power in the form of a battery or battery pack which is connected to, or integrated in, power circuitry 487. The battery may provide backup power should the external power source fail. Other types of power sources, such as photovoltaic devices, may also be used.

Alternative embodiments of network node 460 may include additional components beyond those shown in FIG. 4 that may be responsible for providing certain aspects of the network node's functionality, including any of the functionality described herein and/or any functionality necessary to support the subject matter described herein. For example, network node 460 may include user interface equipment to allow input of information into network node 460 and to allow output of information from network node 460. This may allow a user to perform diagnostic, maintenance, repair, and other administrative functions for network node 460.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a target device, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 410 includes antenna 411, interface 414, processing circuitry 420, device readable medium 430, user interface equipment 432, auxiliary equipment 434, power source 436 and power circuitry 437. WD 410 may include multiple sets of one or more of the illustrated components for different wireless technologies supported by WD 410, such as, for example, GSM, WCDMA, LTE, NR, WiFi, WiMAX, or Bluetooth wireless technologies, just to mention a few. These wireless technologies may be integrated into the same or different chips or set of chips as other components within WD 410.

Antenna 411 may include one or more antennas or antenna arrays, configured to send and/or receive wireless signals, and is connected to interface 414. In certain alternative embodiments, antenna 411 may be separate from WD 410 and be connectable to WD 410 through an interface or port. Antenna 411, interface 414, and/or processing circuitry 420 may be configured to perform any receiving or transmitting operations described herein as being performed by a WD. Any information, data and/or signals may be received from a network node and/or another WD. In some embodiments, radio front end circuitry and/or antenna 411 may be considered an interface.

As illustrated, interface 414 comprises radio front end circuitry 412 and antenna 411. Radio front end circuitry 412 comprise one or more filters 418 and amplifiers 416. Radio front end circuitry 414 is connected to antenna 411 and processing circuitry 420, and is configured to condition signals communicated between antenna 411 and processing circuitry 420. Radio front end circuitry 412 may be coupled to or a part of antenna 411. In some embodiments, WD 410 may not include separate radio front end circuitry 412; rather, processing circuitry 420 may comprise radio front end circuitry and may be connected to antenna 411. Similarly, in some embodiments, some or all of RF transceiver circuitry 422 may be considered a part of interface 414. Radio front end circuitry 412 may receive digital data that is to be sent out to other network nodes or WDs via a wireless connection. Radio front end circuitry 412 may convert the digital data into a radio signal having the appropriate channel and bandwidth parameters using a combination of filters 418 and/or amplifiers 416. The radio signal may then be transmitted via antenna 411. Similarly, when receiving data, antenna 411 may collect radio signals which are then converted into digital data by radio front end circuitry 412. The digital data may be passed to processing circuitry 420. In other embodiments, the interface may comprise different components and/or different combinations of components.

Processing circuitry 420 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 410 components, such as device readable medium 430, WD 410 functionality. Such functionality may include providing any of the various wireless features or benefits discussed herein. For example, processing circuitry 420 may execute instructions stored in device readable medium 430 or in memory within processing circuitry 420 to provide the functionality disclosed herein.

As illustrated, processing circuitry 420 includes one or more of RF transceiver circuitry 422, baseband processing circuitry 424, and application processing circuitry 426. In other embodiments, the processing circuitry may comprise different components and/or different combinations of components. In certain embodiments processing circuitry 420 of WD 410 may comprise a SOC. In some embodiments, RF transceiver circuitry 422, baseband processing circuitry 424, and application processing circuitry 426 may be on separate chips or sets of chips. In alternative embodiments, part or all of baseband processing circuitry 424 and application processing circuitry 426 may be combined into one chip or set of chips, and RF transceiver circuitry 422 may be on a separate chip or set of chips. In still alternative embodiments, part or all of RF transceiver circuitry 422 and baseband processing circuitry 424 may be on the same chip or set of chips, and application processing circuitry 426 may be on a separate chip or set of chips. In yet other alternative embodiments, part or all of RF transceiver circuitry 422, baseband processing circuitry 424, and application processing circuitry 426 may be combined in the same chip or set of chips. In some embodiments, RF transceiver circuitry 422 may be a part of interface 414. RF transceiver circuitry 422 may condition RF signals for processing circuitry 420.

In certain embodiments, some or all of the functionality described herein as being performed by a WD may be provided by processing circuitry 420 executing instructions stored on device readable medium 430, which in certain embodiments may be a computer-readable storage medium. In alternative embodiments, some or all of the functionality may be provided by processing circuitry 420 without executing instructions stored on a separate or discrete device readable storage medium, such as in a hard-wired manner. In any of those particular embodiments, whether executing instructions stored on a device readable storage medium or not, processing circuitry 420 can be configured to perform the described functionality. The benefits provided by such functionality are not limited to processing circuitry 420 alone or to other components of WD 410, but are enjoyed by WD 410 as a whole, and/or by end users and the wireless network generally.

Processing circuitry 420 may be configured to perform any determining, calculating, or similar operations (e.g., certain obtaining operations) described herein as being performed by a WD. These operations, as performed by processing circuitry 420, may include processing information obtained by processing circuitry 420 by, for example, converting the obtained information into other information, comparing the obtained information or converted information to information stored by WD 410, and/or performing one or more operations based on the obtained information or converted information, and as a result of said processing making a determination.

Device readable medium 430 may be operable to store a computer program, software, an application including one or more of logic, rules, code, tables, etc. and/or other instructions capable of being executed by processing circuitry 420. Device readable medium 430 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 420. In some embodiments, processing circuitry 420 and device readable medium 430 may be considered to be integrated.

User interface equipment 432 may provide components that allow for a human user to interact with WD 410. Such interaction may be of many forms, such as visual, audial, tactile, etc. User interface equipment 432 may be operable to produce output to the user and to allow the user to provide input to WD 410. The type of interaction may vary depending on the type of user interface equipment 432 installed in WD 410. For example, if WD 410 is a smart phone, the interaction may be via a touch screen; if WD 410 is a smart meter, the interaction may be through a screen that provides usage (e.g., the number of gallons used) or a speaker that provides an audible alert (e.g., if smoke is detected). User interface equipment 432 may include input interfaces, devices and circuits, and output interfaces, devices and circuits. User interface equipment 432 is configured to allow input of information into WD 410, and is connected to processing circuitry 420 to allow processing circuitry 420 to process the input information. User interface equipment 432 may include, for example, a microphone, a proximity or other sensor, keys/buttons, a touch display, one or more cameras, a USB port, or other input circuitry. User interface equipment 432 is also configured to allow output of information from WD 410, and to allow processing circuitry 420 to output information from WD 410. User interface equipment 432 may include, for example, a speaker, a display, vibrating circuitry, a USB port, a headphone interface, or other output circuitry. Using one or more input and output interfaces, devices, and circuits, of user interface equipment 432, WD 410 may communicate with end users and/or the wireless network, and allow them to benefit from the functionality described herein.

Auxiliary equipment 434 is operable to provide more specific functionality which may not be generally performed by WDs. This may comprise specialized sensors for doing measurements for various purposes, interfaces for additional types of communication such as wired communications etc. The inclusion and type of components of auxiliary equipment 434 may vary depending on the embodiment and/or scenario.

Power source 436 may, in some embodiments, be in the form of a battery or battery pack. Other types of power sources, such as an external power source (e.g., an electricity outlet), photovoltaic devices or power cells, may also be used. WD 410 may further comprise power circuitry 437 for delivering power from power source 436 to the various parts of WD 410 which need power from power source 436 to carry out any functionality described or indicated herein. Power circuitry 437 may in certain embodiments comprise power management circuitry. Power circuitry 437 may additionally or alternatively be operable to receive power from an external power source; in which case WD 410 may be connectable to the external power source (such as an electricity outlet) via input circuitry or an interface such as an electrical power cable. Power circuitry 437 may also in certain embodiments be operable to deliver power from an external power source to power source 436. This may be, for example, for the charging of power source 436. Power circuitry 437 may perform any formatting, converting, or other modification to the power from power source 436 to make the power suitable for the respective components of WD 410 to which power is supplied.

Figure 2:
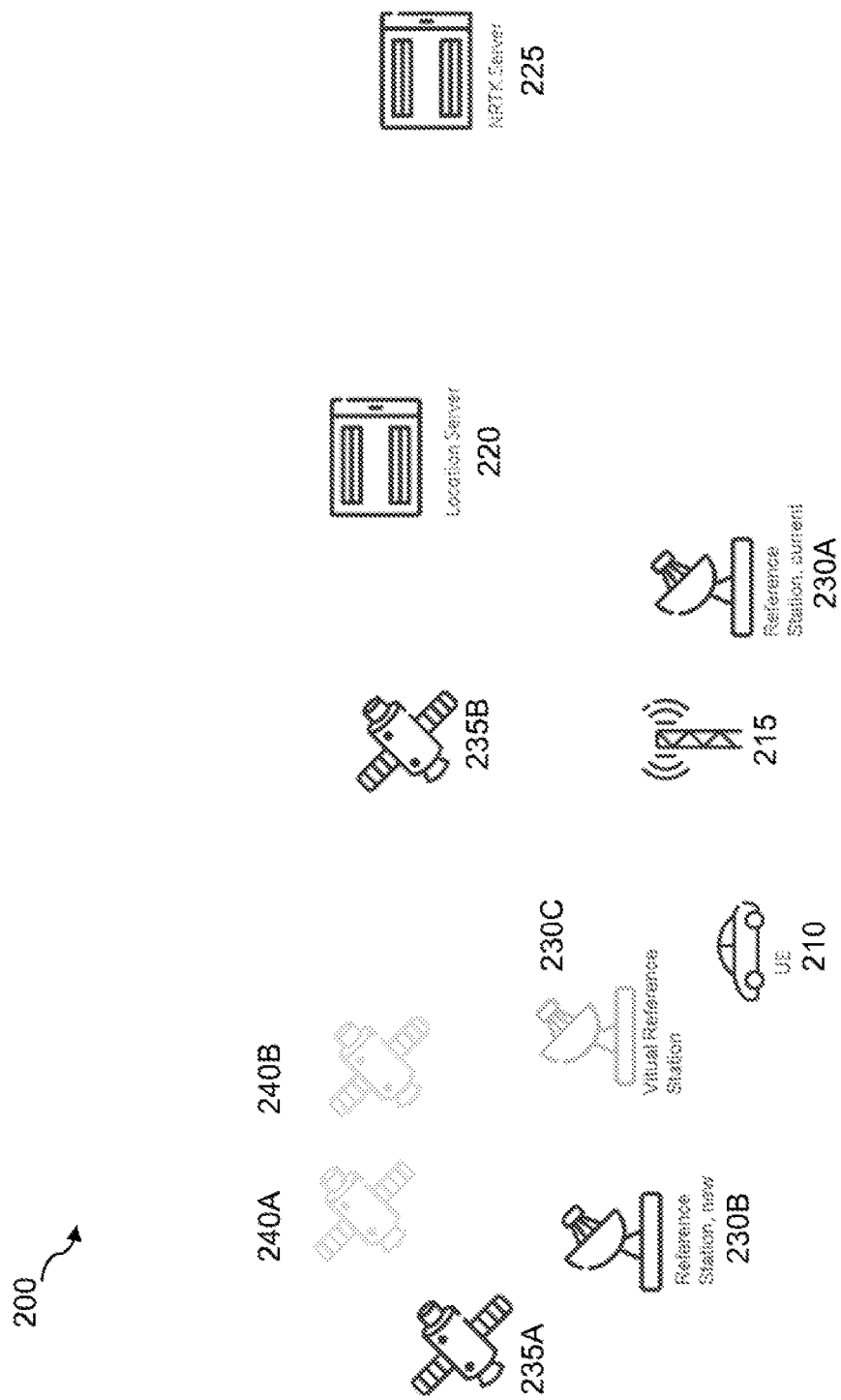
FIG. 2 illustrates an example of a reference station network.
Figure 3:
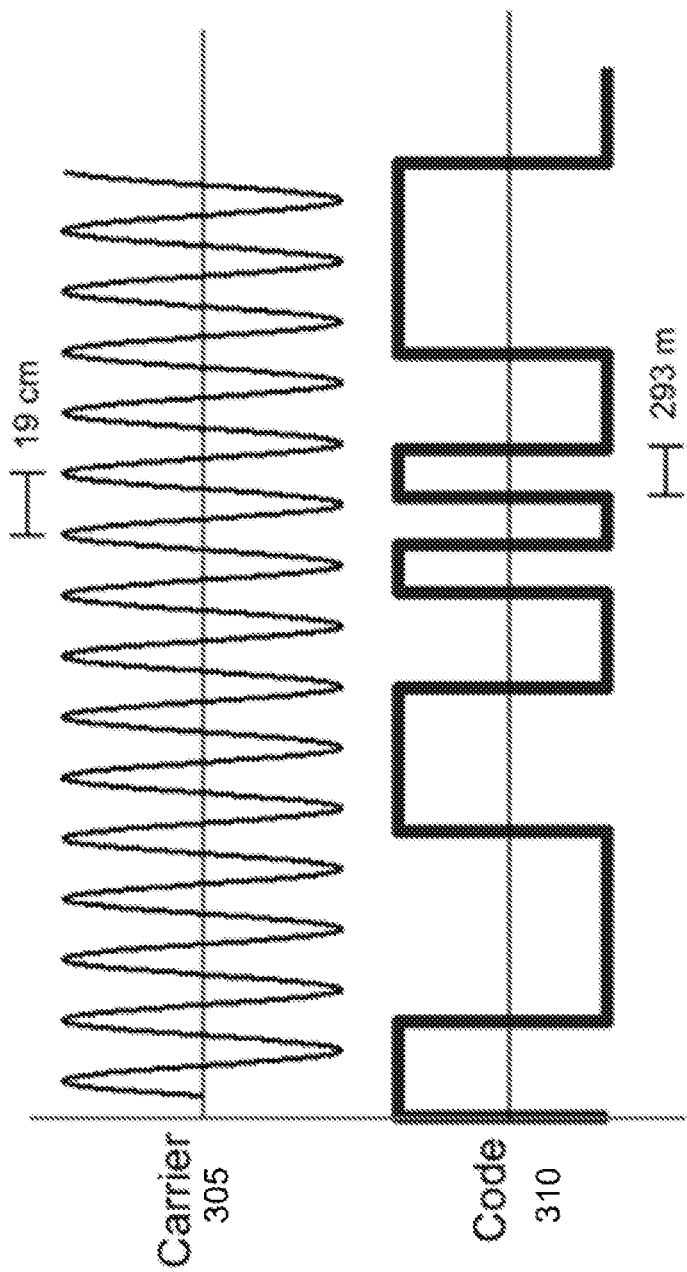
FIG. 3 illustrates a comparison of the carrier-phase and code measurements of satellite signals.

As described above in relation to FIG. 2, when WD 410 moves within a service area (e.g., a service are of the wireless network depicted in FIG. 4), a current reference station of the WD may become more distant while a new reference station becomes more attractive. In such a scenario, the WD 410 needs to reinitialize the integer ambiguity solution with the new reference station. With existing approaches, this process is tedious and takes significant initialization time. In addition to being time consuming, the initialization when changing reference stations results in a period of poor accuracy.

The present disclosure contemplates various embodiments that may address these and other deficiencies associated with existing approaches. In particular, a signaling framework will be described in which WD 410 may request, and a network node (e.g., network node 460, which may be a location server) may provide, reference station transfer information to facilitate a quick transfer of the integer ambiguity solution when the WD 410 is moving from a current reference station to a new reference station within the wireless network of FIG. 4. In certain embodiments, the reference station transfer information is provided to WD 410 at (or near) the instant of time when network node 460 (which, as described above, may be a location server) swaps the reference station, which the observation stems from. The approach described herein advantageously improves upon the existing and alternative approaches described above (which were time consuming and caused periods of inaccuracy at WD 410 or significantly increased signaling costs).

In certain embodiments, WD 410 sends, to network node 460 (which, as described above, may be a location server), a request for reference station transfer information. As described in more detail below, the request for reference station transfer information may be included in a GNSS-RTK-ObservationsReq information element. In certain embodiments, WD 410 may determine that it needs to change from a current reference station to a new reference station (e.g., when WD 410 is moving away from the current reference station). In such a scenario, WD 410 may send the request for reference station transfer information in response to the determination that WD 410 needs to change from the current reference station to the new reference station.

The request for reference station transfer information may include any suitable information. For example, the request for reference station transfer information may include an identifier of the current reference station. As another example, the request for reference station transfer information may include an identifier of the new reference station.

In some cases, WD 410 may provide network node 460 with capability information (e.g., prior to sending the request for reference station transfer information or at another suitable time). For example, WD 410 may send capability information to network node 460. The capability information may indicate whether or not WD 410 is capable of using reference station transfer information. In such a scenario, network node 460 receives capability information the capability information for WD 410. In some cases, WD 410 may send the capability information in response to a request from network node 460 or another network node, or pursuant to one or more predefined rules.

The request for reference station transfer information may be received at network node 460. In response to receiving the request for reference station transfer information from WD 410, network node 460 determines reference station transfer information for at least one pair of satellites associated with the current reference station of WD 410 and the new reference station of WD 410. Network node 460 sends the determined reference station transfer information to the wireless device.

Although the present example describes network node 460 determining the reference station transfer information in response to receiving a request for reference station transfer information from WD 410, the present disclosure is not limited to this example. It should be understood that network node 460 may, in certain embodiments, determine the reference station transfer information in response to information received from one or more other network elements (e.g., another network node 460), autonomously, or, as another example, according to one or more predefined rules.

In certain embodiments, the reference station transfer information may include a double difference of an integer ambiguity solution associated with the current reference station and an integer ambiguity solution associated with the new reference station. In some cases, the reference station transfer information may include reference station transfer information for a first satellite signal of a first satellite in the satellite pair and reference station transfer information for a second satellite signal of a second satellite in the satellite pair. In certain embodiments, the reference station transfer information may include reference station transfer information for one or more global navigation satellite systems. An example approach for determining reference station transfer information is described in more detail below.

In certain embodiments, the reference station transfer information can be determined by network node 460 and provided to WD 410 by utilizing the signalling for Master Auxiliary Concept (MAC) in combination with the observations from physical or non-physical reference stations. As described above, for two receivers a and b making simultaneous measurements at the san nominal time to satellites 1 and 2 the double difference observable is:

$$\phi_a^{12} - \phi_b^{12} = \rho_a^{12} - \rho_b^{12} - I_a^{12} + I_b^{12} + Tr_a^{12} - Tr_b^{12} + \lambda(N_a^{12} - N_b^{12}) + \varepsilon_a^{12} - \varepsilon_b^{12} \quad (3)$$

where:

$$\varnothing_a^{12} = \varnothing_a^1 - \varnothing_a^2 \quad (4)$$

The integer ambiguity solution solved for $N_{ab}^{12}$ etc, where:

$$N_{ab}^{12} = (N_a^1 - N_a^2) - (N_b^1 - N_b^2) \quad (5)$$

For a UE (e.g., WD 410) denoted r (rover), and a current reference station c, the UE maintains the integer solutions $N_{rc}^{ij}$ for the two satellites i and j. Eventually, when the UE has transferred to a new reference station n, the UE needs to solve for $N_{rn}^{ij}$ instead. As described above, this will require some initialization time and cause a period of inaccuracy for WD 410.

Given equation (5) above, there is a relation between $N_{rc}^{ij}$ and $N_{rn}^{ij}$ that can be exploited:

$$N_{rn}^{ij} = N_{rc}^{ij} + N_{cn}^{ij} = N_{rc}^{ij} + (N_c^i - N_c^j) - (N_n^i - N_n^j) \quad (6)$$

Given the above, the information WD 410 needs to translate from $N_{rc}^{ij}$ to $N_{rn}^{ij}$ is readily available as the GNSS RTK observations from the current and the new reference station, for pairs of satellites, or essentially all satellites but one in relation to one reference satellite.

The double difference can be formed by the difference of data (integer-ms+rough-range+fine-PhaseRange, where each term is added with the correct scale factor) for a satellite j and a reference satellite i, for on the one hand the current reference station, and one the other hand the new reference station, and then the difference between these two differences. The integer part of the result is the $N_{rn}^{ij}$. In a well-maintained reference network, this integer is within +/−5, but it can be good to have some margin for less maintained networks.

WD 410 obtains the reference station transfer information for at least one pair of satellites, and determines an integer ambiguity solution associated with the new reference station based on the obtained reference station transfer information and an integer ambiguity solution associated with the current reference station. WD 410 may then estimate a position of WD 410 based on the integer ambiguity solution associated with the new reference station and one or more of carrier phase observations from the new reference station.

As described above, in certain embodiments WD 410 may send a request for reference station transfer information to network node 460, indicating that it desires reference station transfer information. WD 410 may also indicate its current reference station as well as the new reference station. An example of the signaling for the request for reference station transfer information in Abstract Syntax Notation One format is given below:

GNSS-RTK-ObservationsReq

The IE GNSS-RTK-ObservationsReq is used by the WD (e.g., a target device) to request the GNSS-RTK-Observations assistance from the network node (e.g., a location server).

```
-- ASN1START
GNSS-RTK-ObservationsReq-r15::= SEQUENCE {
    gnss-RTK-SignalsReq-r15             GNSS-SignalIDs,
    gnss-RTK-PhaseRangeRateReq-r15      BOOLEAN,
    gnss-RTK-CNR-Req-r15                BOOLEAN,
    stationID-r15                       GNSS-ReferenceStationID-r15  OPTIONAL,
    currStationID-r15                   GNSS-ReferenceStationID-r15  OPTIONAL,
    gnss-RTK-RStransferInfoReq-r15      BOOLEAN                      OPTIONAL,
    ...
}
-- ASN1STOP
```

The various fields of the GNSS-RTK-ObservationsReq element are described in more detail in Table 1 below.

TABLE 1

GNSS-RTK-ObservationsReq field descriptions gnss-RTK-SignalsReq
This field specifies the GNSS Signal(s) for which
the GNSS-RTK-Observations are requested.
A one-value at a bit position means RTK observations for the
specific signal are requested; a zero-value means not requested.
gnss-RTK-PhaseRangeRateReq
This field specifies whether the rough-phase-range-rate and fine-
PhaseRangeRate are requested or not. TRUE means requested.
gnss-RTK-CNR-Req
This field specifies whether the carrier-to-noise-ratio is requested or not.
TRUE means requested.
stationID
This field specifies the Station ID for which the GNSS-RTK-
Observations are requested.
currStationID
This field specifies the Station ID for which the GNSS-RTK-
Observations have been requested up until now.

TABLE 1-continued

GNSS-RTK-ObservationsReq field descriptions gnss-RTK-RStransferInfoReq
This field specifies whether the reference station transfer
information is requested or not TRUE means requested.

As described above, network node 460 will determine the reference station transfer information (e.g., by computing the double different integer ambiguity solution for the pair of receivers associated to the current and new reference stations, as well as for pairs of satellites). In certain embodiments, network node 460 may utilize the carrier phase measurements from the two reference stations and for pairs of satellites. Network node 460 then sends the determined reference station transfer information to WD 410. An example of the signaling that may be used for sending the reference station transfer information is given below.

GNSS-GenericAssistData

The IE GNSS-GenericAssistData is used by a network node (e.g., location server) to provide assistance data for a specific GNSS (e.g., GPS, Galileo, GLONASS, BDS, etc.). The specific GNSS for which the provided assistance data are applicable is indicated by the IE GNSS-ID and (if applicable) by the IE SBAS-ID. Assistance for up to 16 GNSSs can be provided.

```
--ASN1START
GNSS-GenericAssistData ::= SEQUENCE (SIZE (1..16)) OF GNSS-GenericAssistDataElement
GNSS-GenericAssistDataElement ::= SEQUENCE {
    gnss-ID                         GNSS-ID,
    sbas-ID                         SBAS-ID                          OPTIONAL,  --Cond GNSS-ID-SBAS
    gnss-TimeModels                 GNSS-TimeModelList               OPTIONAL,  --Need ON
    gnss-DifferentialCorrections    GNSS-DifferentialCorrections     OPTIONAL,  --Need ON
    gnss-NavigationModel            GNSS-NavigationModel             OPTIONAL,  --Need ON
    gnss-RealTimeIntegrity          GNSS-RealTimeIntegrity           OPTIONAL,  --Need ON
    gnss-DataBitAssistance          GNSS-DataBitAssistance           OPTIONAL,  --Need ON
    gnss-AcquisitionAssistance      GNSS-AcquisitionAssistance       OPTIONAL,  --Need ON
    gnss-Almanac                    GNSS-Almanac                     OPTIONAL,  --Need ON
    gnss-UTC-Model                  GNSS-UTC-Model                   OPTIONAL,  --Need ON
    gnss-Auxiliaryl nformation      GNSS-AuxiliaryInformation        OPTIONAL,  --Need ON
    ...,
    [[
        bds-DifferentialCorrections-r12
                                    BDS-DifferentialCorrections-r12  OPTIONAL,  --Cond GNSS-ID-BDS
        bds-GridModel-r12           BDS-GridModelParameter-r12       OPTIONAL   --Cond GNSS-ID-BDS
    ]],
    [[
        gnss-RTK-Observations-r15   GNSS-RTK-Observations-r15        OPTIONAL,  --Need ON
        gnss-RTK-RStransferInfo-r15 GNSS-RTK-RStransferInfo-r15      OPTIONAL,  --Cond RTK-RST
        glo-RTK-BiasInformation-r15 GLO-RTK-BiasInformation-r15      OPTIONAL,  --Cond GNSS-ID-GLO
        gnss-RTK-MAC-Correction Differences-r15
                                    GNSS-RTK-MAC-CorrectionDifferences-r15
                                                                     OPTIONAL,  --Need ON
```

-continued

| | | | |
|---|---|---|---|
| gnss-RTK-Residuals-r15 | GNSS-RTK-Residuals-r15 | OPTIONAL, | —Need ON |
| gnss-RTK-FKP-Gradients-r15 | GNSS-RTK-FKP-Gradients-r15 | OPTIONAL, | —Need ON |
| gnss-SSR-OrbitCorrections-r15 | GNSS-SSR-OrbitCorrections-r15 | OPTIONAL, | —Need ON |
| gnss-SSR-ClockCorrections-r15 | GNSS-SSR-ClockCorrections-r15 | OPTIONAL, | —Need ON |
| gnss-SSR-CodeBias-r15 | GNSS-SSR-CodeBias-r15 | OPTIONAL | —Need ON |

```
]]
{
—ASN1STOP
```

Certain fields of the GNSS-GenericAssistData element are described in more detail below.

TABLE 2

| Conditional presence | Explanation |
|---|---|
| GNSS-ID-SBAS | The field is mandatory present if the GNSS-ID = sbas; otherwise it is not present. |
| GNSS-ID-BDS | The field may be present if the GNSS-ID = bds; otherwise it is not present. |
| GNSS-ID-GLO | The field may be present if the GNSS ID = glonass; otherwise it is not present. |
| RTK-RST | The field may be present if gnss-RTK-Observations is present, otherwise it is not present |

[ . . . ]
6.5.2.2 GNSS Assistance Data Elements
[ . . . ]
GNSS-RTK-Observations

The IE GNSS-RTK-Observations is used by a network node (e.g., location server) to provide GNSS reference station observables (pseudorange, phaserange, phaserange-rate (Doppler), and carrier-to-noise ratio) of the GNSS signals. Essentially, these parameters describe the range and derivatives from respective satellites to the reference station location provided in IE GNSS-RTK-ReferenceStationInfo at the reference time GNSS-SystemTime provided in IE GNSS-ReferenceTime. Whenever GNSS-RTK-Observations is provided by the network node (e.g., location server), the IE GNSS-ReferenceTime shall be provided as well.

The parameters provided in IE GNSS-RTK-Observations are used as specified for message type 1071-1127.

Certain fields of the GNSS-RTK-Observations information element are described in more detail below.

| GNSS-RTK-Observations field descriptions |
|---|
| svID |
| This field specifies the GNSS SV-ID of the satellite for which the GNSS Observations are provided. |
| integer-ms |
| This field contains the integer number of milliseconds in the satellite rough range. Rough range can be used to restore complete observables for a given satellite. |
| Scale factor 1 milli-second in the range from 0 to 254 milli-seconds. |
| rough-range |
| This field contains the sub-milliseconds in the satellite rough range (modulo 1 millisecond). |
| Scale factor $2^{-10}$ milli-seconds in the range from 0 to $(1-2^{-10})$ milli-seconds. |
| rough-phase-range-rate |
| This field contains the GNSS satellite rough phaserange rate. |
| Scale factor 1 m/s. Range ± 8191 m/s. |
| gnss-SignalID |
| This field specifies the GNSS signal for which the GNSS observations are provided. |
| fine-PseudoRange |
| This field contains the GNSS signal fine pseudorange. |
| Being added to fields integer-ms and rough-range allows getting the full pseudorange observable corresponding to given signal. NOTE 1. |
| Scale factor $2^{-29}$ milli-seconds. Range ± $(2^{-10}\text{-}2^{-29})$ milli-seconds. |
| fine-PhaseRange |
| This field contains the GNSS signal fine phaserange. |
| Being added to fields integer-ms and rough-range allows getting the full phaserange observable corresponding to given signal. NOTE 2. |
| Scale factor $2^{-31}$ milli-seconds. Range ± $(2^{-8}\text{-}2^{-31})$ milli-seconds. |

```
— ASN1START
GNSS-RTK-Observations-r15 ::= SEQUENCE (SIZE(1..64)) OF GNSS-RTK-SatelliteDataElement-r15
GNSS-RTK-SatelliteDataElement-r15 ::= SEQUENCE{
    svID-r15                         SV-ID,
    integer-ms-r15                   INTEGER (0..254),
    rough-range-r15                  INTEGER (0..1023),
    rough-phase-range-rate-r15       INTEGER (-8192..8191)              OPTIONAL,
    gnss-rtk-SatelliteSignalDataList-r15    GNSS-RTK-SatelliteSignalDataList-r15,
    . . .
}
GNSS-RTK-SatelliteSignalDataList-r15 ::= SEQUENCE (SIZE(1..24)) OF
                                    GNSS-RTK-SatelliteSignalDataElement-r15
GNSS-RTK-SatelliteSignalDataElement-r15 ::= SEQUENCE {
    gnss-SignalID-r15                GNSS-SignalID,
    fine-PseudoRange-r15             INTEGER (-524288..524287),
    fine-PhaseRange-r15              INTEGER (-8388608..8388607),
    lockTimeIndicator-r15            INTEGER (0..1023),
    halfCycleAmbiguityIndicator-r15  BIT STRING (SIZE (1)),
    carrier-to-noise-ratio-r15       INTEGER (0..1023)                  OPTIONAL,
    fine-PhaseRangeRate-r15          INTEGER (-16384..16383)            OPTIONAL,
    . . .
}
— ASN1STOP
```

| GNSS-RTK-Observations field descriptions |
| --- |
| lockTimeIndicator
This field provides a measure of the amount of time during which the receiver has maintained continuous lock on that satellite signal. If a cycle slip occurs during the previous measurement cycle, the lock time indicator shall be reset to zero.
Mapping according to the table lockTimeIndicator value to interpretation lock-time relation shown below.
halfCycleAmbiguityIndicator
Value 0 indicates no half-cycle ambiguity. Value 1 indicates half-cycle ambiguity.
When providing phaserange with unresolved polarity encoding this bit shall be set to 1. A target device that is not capable of handling half-cycle ambiguities shall skip such phaserange observables. If polarity resolution forced phaserange to be corrected by half-a-cycle, then the lockTimeIndicator must be reset to zero, indicating that despite continuous tracking the final phaserange experienced non-continuity.
carrier-to-noise-ratio
This field provides the GNSS signal carrier-to-noise-ratio in dB-Hz. Scale factor 2-4 dB-Hz in the range from 0.0625 to 63.9375 dB-Hz. |

| GNSS-RTK-Observations field descriptions |
| --- |
| fine-PhaseRangeRate
This field contains the GNSS signal fine Phase Range Rate.
Full phaserange rate is the sum of this field and the rough-phase-range-rate field.
NOTE 3.
Scale factor 0.0001 m/s. Range ± 1.6383 m/s.
NOTE 1:
Complete Pseudorange for each signal (i) of given satellite can be restored as follows:
Pseudorange(i) = c/1000 × (integer-ms + rough_range/1024 + $2^{-29}$ × fine_Pseudorange(i)), meter.
NOTE 2:
Complete Phaserange for each signal (i) of given satellite can be restored as follows:
Phaserange(i) = c/1000 × (integer-ms + rough_range/1024 + $2^{-31}$ × fine_Phaserange(i)), meter.
NOTE 3:
Complete PhaseRangeRate for each signal (i) of given satellite can be restored as follows:
PhaseRangeRate(i) = rough-phase-range-rate + 0.0001*fine-PhaseRangeRate (i), meter/sec.
NOTE 4:
The speed of light c is 299,792,458 meters per second. |

TABLE 3 lockTimeIndicator value to interpretation lock-time relation

| Indicator (i) | Supplementary coefficient (k) | Minimum Lock Time (ms) | Range of Indicated Lock Times (t) (ms) |
| --- | --- | --- | --- |
| 0-63 | 1 | i | $0 < t < 64$ |
| 64-95 | 2 | 2 × i − 64 | $64 \leq t < 128$ |
| 96-127 | 4 | 4 × i − 256 | $128 \leq t < 256$ |
| 128-159 | 8 | 8 × i − 768 | $256 \leq t < 512$ |
| 160-191 | 16 | 16 × i − 2048 | $512 \leq t < 1024$ |
| 192-223 | 32 | 32 × i − 5120 | $1024 \leq t < 2048$ |
| 224-255 | 64 | 64 × i − 12288 | $2048 \leq t < 4096$ |
| 256-287 | 128 | 128 × i − 28672 | $4096 \leq t < 8192$ |
| 288-319 | 256 | 256 × i − 65536 | $8192 \leq t < 16384$ |
| 320-351 | 512 | 512 × i − 147456 | $16384 \leq t < 32768$ |
| 352-383 | 1024 | 1024 × i − 327680 | $32768 \leq t < 65536$ |
| 384-415 | 2048 | 2048 × i − 720896 | $65536 \leq t < 131072$ |
| 416-447 | 4096 | 4096 × i − 1572864 | $131072 \leq t < 262144$ |
| 448-479 | 8192 | 8192 × i − 3407872 | $262144 \leq t < 524288$ |
| 480-511 | 16384 | 16384 × i − 7340032 | $524288 \leq t < 1048576$ |
| 512-543 | 32768 | 32768 × i − 15728640 | $1048576 \leq t < 2097152$ |
| 544-575 | 65536 | 65536 × i − 33554432 | $2097152 \leq t < 4194304$ |
| 576-607 | 131072 | 131072 × i − 71303168 | $4194304 \leq t < 8388608$ |
| 608-639 | 262144 | 262144 × i − 150994944 | $8388608 \leq t < 16777216$ |
| 640-671 | 524288 | 524288 × i − 318767104 | $16777216 \leq t < 33554432$ |
| 672-703 | 1048576 | 1048576 × i − 671088640 | $33554432 \leq t < 67108864$ |
| 704 | 2097152 | 2097152 × i − 1409286144 | $67108864 \leq t$ |
| 705-1023 | | Reserved | |

GNSS-RTK-RStransferInfo

The IE GNSS-RTK-RStransferInfo is used by the network node (e.g., location server) to provide GNSS reference station transfer information to a WD (e.g., a target device) to enable the device to transfer the integer ambiguity solution associated to a current reference station to a new reference station. The transfer information is provided as a double difference of the integer parts associated to both the current and new reference stations as well as for each satellite and a reference satellite.

```
—ASN1START
GNSS-RTK-RStransferInfo-r15 ::= SEQUENCE{
    currentStationID-r15         GNSS-ReferenceStationID-r15,
    newStationID-r15             GNSS-ReferenceStationID-r15,
    svIDref-r15                  SV-ID,
    gnss-rtk-RStransferInfoList-r15   GNSS-RTK-RStransferInfoList-r15,
    ...
}
```

```
GNSS-RTK-RStransferInfoList-r15 ::= SEQUENCE (SIZE(1..63)) OF
                                    GNSS-RTK-RStransferInfoListElement-r15
GNSS-RTK-RStransferInfoListElement-r15 ::= SEQUENCE {
    svID-r15                    SV-ID,
    gnss-rtk-RStransferDataList-r15    GNSS-RTK-RStransferDataList-r15
    ...
}
GNSS-RTK-RStransferDataList-r15 ::= SEQUENCE(SIZE(1..24)) OF
                                    GNSS-RTK-RStransferDataListElement-r15
GNSS-RTK-RStransferDataListElement ::= SEQUENCE {
    gnss-SignalID-r15           GNSS-SignalID,
    rsTransferInteger           INTEGER (-127..128),
    ...
}
—ASN1STOP
```

Certain fields of the GNSS-RTK-Observations information element are described in more detail below.

TABLE 4

GNSS-RTK-Observations field descriptions svIDref
This field specifies the GNSS SV-ID of the satellite used as reference of the reference station transfer information for the integer ambiguity solution.
svID
This field specifies the GNSS SV-ID of any satellite except the reference satellite and is used to identify the satellite to which the reference station transfer information is associated to.
currentStationID
The ID of the current reference stations, i.e. the reference station the target device is transferring from
newStationID
The ID of the new reference stations, i.e. the reference station the target device is transferring to
gnss-SignalID
This field specifies the GNSS signal for which the reference station transfer information is associated to.
rsTransferInteger
The double difference integer ambiguity solution transfer information, that transfers the double difference integer ambiguity solution associated to the current reference station and the device to the double difference integer ambiguity solution associated to the new reference station.

The following section illustrates an example approach to how one or more of the above-described embodiments may be implemented into a standard. The description below reflects one possible approach, and the present disclosure is not limited to the examples described below. Modifications, additions, or omissions may be made to the example approach described below without departing from the scope of the present disclosure.

The work on introducing the agreements concerning GNSS RTK into the running LPP CR includes providing support for GNSS RTK assistance data to implement physical and non-physical reference stations, Flächen-Korrektur-Parameter (FKP) (area correction parameter) and Master Auxiliary Concept (MAC). However, the current running change request only enables the configuration of one physical or non-physical reference stations and associated observations. There are requests for the support of multiple streams with several reference stations, as well as the possibility to provide both physical and non-physical reference station observations. This discussion applies to the design of the information in LPP, upon which both the unicast via LPP and the broadcast via RRC/SIB relies. In the following sections, various proposals are set forth to address this.

The GNSS reference station information can include details about its position, its antenna configuration, whether it is a physical or non-physical station, and some information about how signals are processed at the reference station. The GNSS observations can be provided for different GNSS, different satellites of a specific GNSS, for different signals of the satellites, and for different measurement types associated to these signals. All of these are represented in the latest draft of the running LPP change request.

However, the current text only allows one single reference station to be configured, and the observations can only be associated from that specific reference station. This, however, may be too limiting. Rather, this can be extended to N number of reference stations that can be configured in the GNSS-RTK-ReferenceStationInfo-r15 and GNSS-RTK-CommonObservationInfo IEs of the GNSS-CommonAssistData respectively. Thus, one proposed approach is to extend GNSS-RTK-ReferenceStationInfo and GNSS-RTK-CommonObservationInfo IEs to include up to N number of reference stations.

Moreover, the value of the parameter N also needs to be agreed upon. For example, N=32 is a reasonable number. Thus, one proposed approach is to use N=32.

These proposals can be incorporated into the standard as shown below in the text proposal to 3GPP TS 36.355:
Text Proposal to TS 36.355
6.5.2.2 GNSS Assistance Data Elements
[ . . . ]
  GNSS-CommonAssistData
  The IE GNSS-CommonAssistData is used by the location server to provide assistance data which can be used for any GNSS (e.g., GPS, Galileo, GLONASS, BDS, etc.).

```
—ASN1START
GNSS-CommonAssistData ::= SEQUENCE {
    gnss-ReferenceTime              GNSS-ReferenceTime              OPTIONAL,  —Need ON
    gnss-ReferenceLocation          GNSS-ReferenceLocation          OPTIONAL,  —Need ON
    gnss-IonosphericModel           GNSS-IonosphericModel           OPTIONAL,  —Need ON
    gnss-EarthOrientationParameters GNSS-EarthOrientationParameters OPTIONAL,  —Need ON
    ...,
```

-continued

```
[[
    gnss-ReferenceTimeRS-r15        SEQUENCE (SIZE (1..32)) OF GNSS-ReferenceTime
OPTIONAL,        —Cond RTK2
    gnss-RTK-ReferenceStationInfo-r15
                                    GNSS-RTK-ReferenceStationInfo-r15        OPTIONAL,   —Need ON
    gnss-RTK-CommonObservationInfo-r15
                                    GNSS-RTK-CommonObservationInfo-r15   OPTIONAL,   —Cond RTK
    gnss-RTK-AuxiliaryStationData-r15
                                    GNSS-RTK-AuxiliaryStationData-r15        OPTIONAL    —Need ON
]]
}
—ASN1STOP
```

| Conditional presence | Explanation |
|---|---|
| RTK | The field is mandatory present if the IE GNSS-RTK-Observations is included in IE GNSS-GenericAssistData; otherwise it is not present. |
| RTK2 | The field is mandatory present if more than one reference stations is configured in gnss-RTK-ReferenceStationInfo and the reference stations are subject to different GNSS-ReferenceTime. Otherwise, it is not present |

[ . . . ]

GNSS-RTK-ReferenceStationInfo

The IE GNSS-RTK-ReferenceStationInfo is used by the location server to provide the Earth-centered, Earth-fixed (ECEF) coordinates of the antenna reference point (ARP) of the physical and/or non-physical reference stations for which the GNSS-RTK-Observations assistance data are provided together with reference station antenna and receiver description.

The parameters provided in IE GNSS-RTK-ReferenceStationInfo are used as specified for message type 1006 and 1033 in [30].

```
—ASN1START
GNSS-RTK-ReferenceStationInfo-r15 ::=
SEQUENCE (SIZE (1..32)) OF GNSS-RTK-ReferenceStationInfoElement-r15
GNSS-RTK-ReferenceStationInfoElement-r15 ::= SEQUENCE {
    referenceStationID-r15              GNSS-ReferenceStationID-r15,
    referenceStationIndicator-r15       ENUMERATED {physical, non-physical
    antenna-reference-point-ECEF-X-r15  INTEGER (−137438953472..137438953471),
    antenna-reference-point-ECEF-Y-r15  INTEGER (−137438953472..137438953471),
    antenna-reference-point-ECEF-Z-r15  INTEGER (−137438953472..137438953471),
    antennaDescription-r15              ReceiverAndAntennaDescription-r15 OPTIONAL, —Need ON
    . . .
}
ReceiverAndAntennaDescription-r15 ::= SEQUENCE {
    antennaDescriptor-r15       VisibleString (SIZE (1..256)),
    antennaSetUpID-r15          INTEGER (0..255),
    antennaSerialNumber-r15     VisibleString (SIZE (1..256)),
    receiverTypeDescriptor-r15  VisibleString (SIZE (1..256)),
    receiverFirmwareVersion-r15 VisibleString (SIZE (1..256)),
    receiverSerialNumber-r15    VisibleString (SIZE (1..256)),
    . . .
}
—ASN1STOP
```

GNSS-RTK-ReferenceStationInfo field descriptions referenceStationID
The Reference Station ID is determined by the RTK service provider.
referenceStationIndicator
This fields specifies type of reference station. Enumerated value physical indicates a real, physical reference station; value non-physical indicates a non-physical or computed reference station.
antenna-reference-point-ECEF-X
This field specifies the antenna reference point X-coordinate in the World Geodetic System 1984 (WGS 84) datum.
Scale factor 0.0001 m; range ± 13,743,895.3471 m.
antenna-reference-point-ECEF-Y
This field specifies the antenna reference point Y-coordinate in the World Geodetic System 1984 (WGS 84) datum.
Scale factor 0.0001 m; range ± 13,743,895.3471 m.
antenna-reference-point-ECEF-Z
This field specifies the antenna reference point Z-coordinate in the World Geodetic System 1984 (WGS 84) datum.
Scale factor 0.0001 m; range ± 13,743,895.3471 m.

| GNSS-RTK-ReferenceStationInfo field descriptions |
| --- |
| antennaDescriptor<br>This field provides an ASCII descriptor of the reference station antenna.<br>antennaSetUpID<br>This field specifies the Antenna Setup ID for use by the service provider to indicate the particular reference station-antenna combination. The interpretation of the value is as follows:<br>0 Use standard IGS Model<br>1-255 Specific Antenna Setup ID#<br>antennaSerialNumber<br>This field specifies the antenna serial number as issued by the manufacturer of the antenna.<br>receiverTypeDescriptor, receiverFirmwareVersion, receiverSerialNumber<br>These fields provide an ASCII descriptor of the reference station receiver.<br>The serial number and firmware version strings are not standardized. They will correspond to the manufacturers naming convention. |

GNSS-RTK-CommonObservationInfo

The IE GNSS-RTK-CommonObservationInfo is used by the location server to provide common information applicable to the IE GNSS-RTK-Observations.

The parameters provided in IE GNSS-RTK-CommonObservationInfo are used as specified for message type 1071-1127 in [30].

```
—ASN1START
GNSS-RTK-CommonObservationInfo-r15 ::=
    SEQUENCE (SIZE (1..32)) OF GNSS-RTK-CommonObservationInfoElement-r15
GNSS-RTK-CommonObservationInfoElement-r15 ::= SEQUENCE {
    referenceStationID-r15      GNSS-ReferenceStationID-r15,
    clockSteeringIndicator-r15  INTEGER (0..3),
    externalClockIndicator-r15  INTEGER (0..3),
    smoothingIndicator-r15      BIT STRING (SIZE(1)),
    smoothingInterval-r15       BIT STRING (SIZE(3)),
    ...
}
—ASN1STOP
```

| GNSS-RTK-CommonObservationInfo field descriptions |
| --- |
| referenceStationID<br>This field specifies the Station ID for which the GNSS-RTK-Observations are provided.<br>clockSteeringIndicator<br>This field provides the clock steering indicator. The interpretation of the value is as follows:<br>0 clock steering is not applied<br>In this case receiver clock must be kept in the range of ±1 ms (approximately ±300 km)<br>1 clock steering has been applied<br>In this case receiver clock must be kept in the range of ±1 microsecond (approximately ±300 meters).<br>2 unknown clock steering status<br>3 reserved<br>externalClockIndicator<br>This field provides the external clock indicator. The interpretation of the value is as follows:<br>0 internal clock is used<br>1 external clock is used, clock status is "locked"<br>2 external clock is used, clock status is "not locked", which may indicate external clock failure and that the transmitted data may not be reliable.<br>3 unknown clock is used<br>smoothingIndicator<br>This field provides the GNSS Divergence-free Smoothing Indicator. The interpretation of the value is as follows:<br>1 Divergence-free smoothing is used<br>0 Other type of smoothing is used<br>smoothingInterval<br>The GNSS Smoothing Interval is the integration period over which the pseudorange code phase measurements are averaged using carrier phase information. Divergence-free smoothing may be continuous over the entire period for which the satellite is visible. A value of zero indicates no smoothing is used.<br>See table "smoothingInterval value to interpretation of Smoothing Interval relation" below. | smoothingInterval Value to Interpretation of
Smoothing Interval Relation

| Indicator | Smoothing Interval |
|---|---|
| 000 (0) | No smoothing |
| 001 (1) | <30 s |
| 010 (2) | 30-60 s |
| 011 (3) | 1-2 min |
| 100 (4) | 2-4 min |
| 101 (5) | 4-8 min |
| 110 (6) | >8 min |
| 111 (7) | Unlimited smoothing interval |

Furthermore, the specification should also allow provisioning of observations associated to more than one reference station. Again, this can be extended so that M reference stations can be configured in GNSS-RTK-Observations-r15 and/or GLO-RTK-BiasInformation-r15 of the GNSS-GenericAssistDataElement-r15 and/or in the GNSS-RTK-PeriodicObservations-r15 and/or GLO-RTK-PeriodicBiasInformation-r15 of the GNSS-PeriodicAssistData-r15. Thus, one proposed approach is to extend GNSS-RTK-Observations, GLO-RTK-BiasInformation, GNSS-RTK-PeriodicObservations and GLO-RTK-PeriodicBiasInformation IEs to include up to M number of reference stations.

The value of the parameter M also needs to be agreed upon. N and M will not necessarily need to be the same. For instance, there can be situations where multiple reference stations are configured quite infrequently, while the observations only are provided for a subset of the reference stations (physical and/or non-physical). Thus, one proposed approach is to use M=32.

These proposals can be incorporated into the standard as shown below in the text proposal to 3GPP TS 36.355:

Text Proposal to TS 36.355

6.5.2.2 GNSS Assistance Data Elements

[ ... ]

GNSS-RTK-Observations

The IE GNSS-RTK-Observations is used by the location server to provide GNSS reference station observables (pseudorange, phaserange, phaserange-rate (Doppler), and carrier-to-noise ratio) of the GNSS signals. Essentially, these parameters describe the range and derivatives from respective satellites to the reference station location provided in IE GNSS-RTK-ReferenceStationInfo at the reference time GNSS-SystemTime provided in IE GNSS-ReferenceTime or the IE GNSS-ReferenceTimeRS. Whenever GNSS-RTK-Observations is provided by the location server, the IE GNSS-ReferenceTime or the IE GNSS-ReferenceTimeRS shall be provided as well.

The parameters provided in IE GNSS-RTK-Observations are used as specified for message type 1071-1127 in [30].

```
—ASN1START
GNSS-RTK-Observations-r15 ::= SEQUENCE (SIZE(1..32)) OF GNSS-RTK-ObservationsElement-r15
GNSS-RTK-ObservationsElement-r15 ::= SEQUENCE (SIZE(1..64)) OF GNSS-RTK-SatelliteDataElement-r15
GNSS-RTK-SatelliteDataElement-r15 ::= SEQUENCE{
    svID-r15                              SV-ID,
    integer-ms-r15                        INTEGER (0..254),
rough-range-r15                           INTEGER (0..1023),
    rough-phase-range-rate-r15            INTEGER (-8192..8191)                          OPTIONAL,
    gnss-rtk-SatelliteSignalDataList-r15  GNSS-RTK-SatelliteSignalDataList-r15,
    ...
}
GNSS-RTK-SatelliteSignalDataList-r15 ::= SEQUENCE (SIZE(1..24)) OF
                                         GNSS-RTK-SatelliteSignalDataElement-r15
GNSS-RTK-SatelliteSignalDataElement-r15 ::= SEQUENCE {
    gnss-SignalID-r15                     GNSS-SignalID,
    fine-PseudoRange-r15                  INTEGER (-524288..524287),
    fine-PhaseRange-r15                   INTEGER (-8388608..8388607),
    lockTimeIndicator-r15                 INTEGER (0..1023),
    halfCycleAmbiguityIndicator-r15       BIT STRING (SIZE (1)),
    carrier-to-noise-ratio-r15            INTEGER (0..1023)                              OPTIONAL,
    fine-PhaseRangeRate-r15               INTEGER (-16384..16383)                        OPTIONAL,
    ...
}
—ASN1STOP
```

GNSS-RTK-Observations field descriptions svID
This field specifies the GNSS SV-ID of the satellite for which the GNSS Observations are provided.
integer-ms
This field contains the integer number of milliseconds in the satellite rough range. Rough range can be used to restore complete observables for a given satellite.
Scale factor 1 milli-second in the range from 0 to 254 milli-seconds.
rough-range
This field contains the sub-milliseconds in the satellite rough range (modulo 1 millisecond).
Scale factor $2^{-10}$ milli-seconds in the range from 0 to $(1-2^{-10})$ milli-seconds.
rough-phase-range-rate
This field contains the GNSS satellite rough phaserange rate.
Scale factor 1 m/s. Range ± 8191 m/s.
gnss-SignalID
This field specifies the GNSS signal for which the GNSS observations are provided.

| GNSS-RTK-Observations field descriptions |
| --- |
| fine-PseudoRange
This field contains the GNSS signal fine pseudorange.
Being added to fields integer-ms and rough-range allows getting the full pseudorange observable corresponding to given signal. NOTE 1.
Scale factor $2^{-29}$ milli-seconds. Range $\pm (2^{-10}\text{-}2^{-29})$ milli-seconds.
fine-PhaseRange
This field contains the GNSS signal fine phaserange.
Being added to fields integer-ms and rough-range allows getting the full phaserange observable corresponding to given signal. NOTE 2.
Scale factor $2^{-31}$ milli-seconds. Range $\pm (2^{-8}\text{-}2^{-31})$ milli-seconds.
lockTimeIndicator
This field provides a measure of the amount of time during which the receiver has maintained continuous lock on that satellite signal. If a cycle slip occurs during the previous measurement cycle, the lock time indicator shall be reset to zero.
Mapping according to the table lockTimeIndicator value to interpretation lock-time relation shown below.
halfCycleAmbiguityIndicator
Value 0 indicates no half-cycle ambiguity. Value 1 indicates half-cycle ambiguity.
When providing phaserange with unresolved polarity encoding this bit shall be set to 1. A target device that is not capable of handling half-cycle ambiguities shall skip such phaserange observables. If polarity resolution forced phaserange to be corrected by half-a-cycle, then the lockTimeIndicator must be reset to zero, indicating that despite continuous tracking the final phaserange experienced non-continuity.
carrier-to-noise-ratio
This field provides the GNSS signal carrier-to-noise-ratio in dB-Hz.
Scale factor $2^{-4}$ dB-Hz in the range from 0.0625 to 63.9375 dB-Hz.
fine-PhaseRangeRate
This field contains the GNSS signal fine Phase Range Rate.
Full phaserange rate is the sum of this field and the rough-phase-range-rate field. NOTE 3.
Scale factor 0.0001 m/s. Range $\pm$ 1.6383 m/s. |

NOTE 1:
Complete Pseudorange for each signal (i) of given satellite can be restored as follows: Pseudorange(i) = c/1000 × (integer-ms + rough_range/1024 + $2^{-29}$ × fine_Pseudorange(i)), meter.
NOTE 2:
Complete Phaserange for each signal (i) of given satellite can be restored as follows: Phaserange(i) = c/1000 × (integer-ms + rough_range/1024 + $2^{-31}$ × fine_Phaserange(i)), meter.
NOTE 3:
Complete PhaseRangeRate for each signal (i) of given satellite can be restored as follows: PhaseRangeRate(i) = rough-phase-range-rate + 0.0001*fine-PhaseRangeRate (i), meter/sec.
NOTE 4:
The speed of light c is 299,792,458 meters per second.

| lockTimeIndicator value to interpretation lock-time relation | | | |
| --- | --- | --- | --- |
| Indicator (i) | Supplementary coefficient (k) | Minimum Lock Time (ms) | Range of Indicated Lock Times (t) (ms) |
| 0-63 | 1 | i | 0 ≤ t < 64 |
| 64-95 | 2 | 2 × i − 64 | 64 ≤ t < 128 |
| 96-127 | 4 | 4 × i − 256 | 128 ≤ t < 256 |
| 128-159 | 8 | 8 × i − 768 | 256 ≤ t < 512 |
| 160-191 | 16 | 16 × i − 2048 | 512 ≤ t < 1024 |
| 192-223 | 32 | 32 × i − 5120 | 1024 ≤ t < 2048 |
| 224-255 | 64 | 64 × i − 12288 | 2048 ≤ t < 4096 |
| 256-287 | 128 | 128 × i − 28672 | 4096 ≤ t < 8192 |
| 288-319 | 256 | 256 × i − 65536 | 8192 ≤ t < 16384 |
| 320-351 | 512 | 512 × i − 147456 | 16384 ≤ t < 32768 |
| 352-383 | 1024 | 1024 × i − 327680 | 32768 ≤ t < 65536 |
| 384-415 | 2048 | 2048 × i − 720896 | 65536 ≤ t < 131072 |
| 416-447 | 4096 | 4096 × i − 1572864 | 131072 ≤ t < 262144 |
| 448-479 | 8192 | 8192 × i − 3407872 | 262144 ≤ t < 524288 |
| 480-511 | 16384 | 16384 × i − 7340032 | 524288 ≤ t < 1048576 |
| 512-543 | 32768 | 32768 × i − 15728640 | 1048576 ≤ t < 2097152 |
| 544-575 | 65536 | 65536 × i − 33554432 | 2097152 ≤ t < 4194304 |
| 576-607 | 131072 | 131072 × i − 71303168 | 4194304 ≤ t < 8388608 |
| 608-639 | 262144 | 262144 × i − 150994944 | 8388608 ≤ t < 16777216 |
| 640-671 | 524288 | 524288 × i − 318767104 | 16777216 ≤ t < 33554432 |
| 672-703 | 1048576 | 1048576 × i − 671088640 | 33554432 ≤ t < 67108864 |
| 704 | 2097152 | 2097152 × i − 1409286144 | 67108864 ≤ t |
| 705-1023 | | Reserved | |

GLO-RTK-BiasInformation

The IE GLO-RTK-BiasInformation is used by the location server to provide the so-called "GLONASS Code-Phase bias values" (CPB) for up to all FDMA GLONASS observations.

If IE GNSS-RTK-Observations for gnss-ID=glonass are provided, but IE GLO-RTK-BiasInformation is not provided, the target device assumes that the CPB information has been applied to the GLONASS observation data a priori. The parameters provided in IE GLO-RTK-BiasInformation are used as specified for message type 1230 in [30].

```
—ASN1START
GLO-RTK-BiasInformation-r15 ::= SEQUENCE (SIZE(1..32)) OF GLO-RTK-BiasInformationElement-r15
GLO-RTK-BiasInformationElement-r15 ::= SEQUENCE{
    referenceStationID-r15        GNSS-ReferenceStationID-r15,
    cpbIndicator-r15              BIT STRING (SIZE(1)),
    I1-ca-cpBias-r15              INTEGER (-32768..32767)        OPTIONAL,
    I1-p-cpBias-r15               INTEGER (-32768..32767)        OPTIONAL,
    I2-ca-cpBias-r15              INTEGER (-32768..32767)        OPTIONAL,
    I2-p-cpBias-r15               INTEGER (-32768..32767)        OPTIONAL,
    ...
}
—ASN1STOP
```

GLO-RTK-BiasInformation field descriptions referenceStationID
This field specifies the Station ID for which the GLO-RTK-BiasInformationElement is provided.
GLO-RTK-BiasInformatIon field descriptions
cpbIndicator
This field specifies the GLONASS Code-Phase Bias Indicator. The interpretation of the value is as follows:
0-The GLONASS Pseudorange and Phaserange observations in IE GNSS-RTK-Observations
are not aligned to the same measurement epoch.
1-The GLONASS Pseudorange and Phaserange observations in IE GNSS-RTK-Observations
are aligned to the same measurement epoch.
I1-ca-cpBias
This field specifies the GLONASS L1 C/A Code-Phase Bias, which represents the offset between the L1
C/A Pseudorange and L1 Phaserange measurement epochs in meters.
If cpbIndicator is set to 0, the measurement epoch of the GLONASS L1 Phaserange measurements may be
aligned using:
Aligned GLONASS L1 Phaserange = Full GLONASS L1 Phaserange + GLONASS L1 C/A Code-
Phase Bias.
If cpbIndicator is set to 1, the measurement epoch of the GLONASS L1 Phaserange measurements may be
unaligned using:
Unaligned GLONASS L1 Phaserange = Full GLONASS L1 Phaserange − GLONASS L1 C/A
Code-Phase Bias.
Scale factor 0.02 m. Range ± 655.34 m.
I1-p-cpBias
This field specifies the GLONASS L1 P Code-Phase Bias, which represents the offset between the L1 P
Pseudorange and L1 Phaserange measurement epochs in meters.
If cpbIndicator is set to 0, the measurement epoch of the GLONASS L1 Phaserange measurements may be
aligned using:
Aligned GLONASS L1 Phaserange = Full GLONASS L1 Phaserange + GLONASS L1 P Code-
Phase Bias.
If cpbIndicator is set to 1, the measurement epoch of the GLONASS L1 Phaserange measurements may be
unaligned using:
Unaligned GLONASS L1 Phaserange = Full GLONASS L1 Phaserange − GLONASS L1 P Code-
Phase Bias.
Scale factor 0.02 m. Range ± 655.34 m.
I2-ca-cpBias
This field specifies the GLONASS L2 C/A Code-Phase Bias, which represents the offset between the L2
C/A Pseudorange and L2 Phaserange measurement epochs in meters.
If cpbIndicator is set to 0, the measurement epoch of the GLONASS L2 Phaserange measurements may be
aligned using:
Aligned GLONASS L2 Phaserange = Full GLONASS L2 Phaserange + GLONASS L2 C/A Code-
Phase Bias.
If cpbIndicator is set to 1, the measurement epoch of the GLONASS L2 Phaserange measurements may be
unaligned using:
Unaligned GLONASS L2 Phaserange = Full GLONASS L2 Phaserange − GLONASS L2 C/A
Code-Phase Bias.
Scale factor 0.02 m. Range ± 655.34 m.
I2-p-cpBias
This field specifies the GLONASS L2 P Code-Phase Bias, which represents the offset between the L2 P
Pseudorange and L2 Phaserange measurement epochs in meters.
If cpbIndicator is set to 0, the measurement epoch of the GLONASS L2 Phaserange measurements may be
aligned using:
Aligned GLONASS L2 Phaserange = Full GLONASS L2 Phaserange + GLONASS L2 P Code-
Phase Bias.

| GLO-RTK-BiasInformation field descriptions |
|---|
| If cpbIndicator is set to 1, the measurement epoch of the GLONASS L2 Phaserange measurements may be unaligned using:<br>Unaligned GLONASS L2 Phaserange = Full GLONASS L2 Phaserange − GLONASS L2 P Code-Phase Bias.<br>Scale factor 0.02 m. Range ± 655.34 m. |

This field specifies the Station ID for which the GLO-RTK-BiasInformationElement is provided These changes are needed for the GNSS RTK support based on physical and non-physical reference stations with an observation space representation.

With respect to multiple reference station observations to mobile UEs, for mobile UEs served with RTK corrections via LPP, it is attractive to adapt the scope of the observations based on the crude UE position, for example to only provide observations from the most relevant physical or non-physical reference station. However, at some point, a different reference station from the current becomes most relevant. With an ambition to minimize the information to the UE, the network node (e.g., location server) could simply swap the reference station from one to another. The would probably mean that the UE needs to restart the integer ambiguity resolution, resulting in a fall back to GNSS positioning based on code phase measurements in the meantime with much worse positioning accuracy.

An alternative would be to send observations from several physical or non-physical reference stations in parallel to the UE, and the UE could thereby initiate the integer ambiguity resolution in advance for alternative reference stations. This would require additional processing in the device, and also a multiplication of the needed bandwidth to provide the GNSS RTK observations via LPP. Thus, mobile UEs can be supported by providing GNSS RTK observations from multiple reference stations at the expense of additional processing in the device and a multiplication of the needed LPP signalling costs.

An alternative is to provide some additional information to UE at the instants when the network node (e.g., location server) swaps the reference station, which the observation stems from. The needed information can be provided by utilizing the signalling for MAC in combination with the observations from physical or non-physical reference stations. As described above, from Navpedia we have the following description of the phase measurement, the integer ambiguity N and the error contributions:

$$\phi = \rho - I + T_r + c(b_{Rx} - b_{Sat}) + N\lambda + \varepsilon_\phi \qquad (1)$$

Where:

I is the signal path delay due to the ionosphere;

$T_T$ is the signal path delay due to the troposphere;

$b_{Rx}$ is the receiver clock offset from the reference (GPS) time;

$b_{Sat}$ is the satellite clock offset from the reference (GPS) time:

c is the vacuum speed of light;

λ is the carrier nominal wavelength;

N is the ambiguity of the carrier-phase (integer number);

$\varepsilon_\phi$ are the measurement noise components, including multipath and other effects;

ρ is the geometrical range between the satellite and the receiver, computed as a function of the satellite ($x_{Sat}$, $y_{Sat}$, $z_{Sat}$) and receiver ($x_{Rx}$, $y_{Rx}$, $z_{Rx}$) coordinates as:

$$\rho = \sqrt{(x_{Sat} - x_{Rx})^2 + (y_{Sat} - y_{Rx})^2 + (z_{Sat} - z_{Rx})^2} \qquad (2)$$

Receivers then form the double difference equation

For two receivers a and b making simultaneous measurements at the same nominal time to satellites 1 and 2 the double difference observable is:

$$\phi_a^{12} - \phi_b^{12} = \rho_a^{12} - \rho_b^{12} - I_a^{12} + I_b^{12} + Tr_a^{12} - Tr_b^{12} + \lambda(N_a^{12} - N_b^{12}) + \varepsilon_a^{12} - \varepsilon_b^{12} \qquad (3)$$

Where $$\emptyset_a^{12} = \emptyset_a^1 - \emptyset_a^2 \qquad (4)$$

The integer ambiguity solution solved for $N_{ab}^{12}$ etc, where $$N_{ab}^{12} = (N_a^1 - N_a^2) - (N_b^1 - N_b^2) \qquad (5)$$

For a UE denoted r (rover), and a current reference station c, the UE maintains the integer solutions $N_{rc}^{ij}$ for the two satellites i and j. Eventually, when the UE has transferred to a new reference station n, the UE needs to solve for $N_{rn}^{ij}$ instead. This will require some initialization time etc. Given (5), there is a relation between $N_{rc}^{ij}$ and $N_{rc}^{ij}$ that can be exploited:

$$N_{rn}^{ij} = N_{rc}^{ij} + N_{cn}^{ij} = N_{rc}^{ij} + (N_c^i - N_c^j) - (N_n^i - N_n^j) \qquad (6)$$

The information the UE needs to translate from $N_{rc}^{ij}$ to $N_{rn}^{ij}$ is readily available as the GNSS RTK observations at from the current and the new reference station, for pairs of satellites, or essentially all satellites but one in relation to one reference satellite. Thus, one proposal is to define signalling to enable the UE to translate its integer ambiguity solution associated to a current reference station to an integer solution associated to a new reference station.

The double difference can be formed by the difference of data (integer-ms+rough-range+fine-PhaseRange, where each term is added with the correct scale factor) for a satellite j and a reference satellite i, for on the one hand the current reference station, and one the other hand the new reference station, and then the difference between these two differences. The integer part of the result is the $N_{rn}^{ij}$. In a well maintained reference network, this integer is within +/−5, but it can be good to have some margin for less maintained networks.

These proposals can be incorporated into the standard as shown below in the text proposal to 3GPP TS 36.355:
Text Proposal for TS 36.355
6.5.2 A-GNSS Positioning
6.5.2.1 GNSS Assistance Data
[ . . . ]
  GNSS-GenericAssistData
  The IE GNSS-GenericAssistData is used by the location server to provide assistance data for a specific GNSS (e.g., GPS, Galileo, GLONASS, BDS, etc.). The specific GNSS for which the provided assistance data are applicable is indicated by the IE GNSS-ID and (if applicable) by the IE SBAS-ID. Assistance for up to 16 GNSSs can be provided.

```
—ASN1START
GNSS-GenericAssistData ::= SEQUENCE (SIZE (1..16)) OF GNSS-GenericAssistDataElement
GNSS-GenericAssistDataElement ::= SEQUENCE {
    gnss-ID                         GNSS-ID,
    sbas-ID                         SBAS-ID                             OPTIONAL,   --Cond GNSS-ID-SBAS
    gnss-TimeModels                 GNSS-TimeModelList                  OPTIONAL,   --Need ON
    gnss-DifferentialCorrections    GNSS-DifferentialCorrections        OPTIONAL,   --Need ON
    gnss-NavigationModel            GNSS-NavigationModel                OPTIONAL,   --Need ON
    gnss-RealTimeIntegrity          GNSS-RealTimeIntegrity              OPTIONAL,   --Need ON
    gnss-DataBitAssistance          GNSS-DataBitAssistance              OPTIONAL,   --Need ON
    gnss-AcquisitionAssistance      GNSS-AcquisitionAssistance          OPTIONAL,   --Need ON
    gnss-Almanac                    GNSS-Almanac                        OPTIONAL,   --Need ON
    gnss-UTC-Model                  GNSS-UTC-Model                      OPTIONAL,   --Need ON
    gnss-AuxiliaryInformation       GNSS-AuxiliaryInformation           OPTIONAL,   --Need ON
    ...,
    [[
    bds-DifferentialCorrections-r12
                                    BDS-DifferentialCorrections-r12     OPTIONAL,   --Cond GNSS-ID-BDS
    bds-GridModel-r12               BDS-GridModelParameter-r12          OPTIONAL    --Cond GNSS-ID-BDS
    ]],
    [[
    gnss-RTK-Observations-r15       GNSS-RTK-Observations-r15           OPTIONAL,   --Need ON
    gnss-RTK-RStransferInfo-r15     GNSS-RTK-RStransferInfo-r15         OPTIONAL,   --Cond RTK-RST
    glo-RTK-BiasInformation-r15     GLO-RTK-BiasInformation-r15         OPTIONAL,   --Cond GNSS-ID-GLO
    gnss-RTK-MAC-CorrectionDifferences-r15
                                    GNSS-RTK-MAC-CorrectionDifferences-r15
                                                                        OPTIONAL,   --Need ON
    gnss-RTK-Residuals-r15          GNSS-RTK-Residuals-r15              OPTIONAL,   --Need ON
    gnss-RTK-FKP-Gradients-r15      GNSS-RTK-FKP-Gradients-r15          OPTIONAL,   --Need ON
    gnss-SSR-OrbitCorrections-r15
                                    GNSS-SSR-OrbitCorrections-r15       OPTIONAL,   --Need ON
    gnss-SSR-ClockCorrections-r15
                                    GNSS-SSR-ClockCorrections-r15       OPTIONAL,   --Need ON
    gnss-SSR-CodeBias-r15           GNSS-SSR-CodeBias-r15               OPTIONAL    --Need ON
    ]]
{
—ASN1STOP
```

| Conditional presence | Explanation |
| --- | --- |
| GNSS-ID-SBAS | The field is mandatory present if the GNSS-ID = sbas; otherwise it is not present. |
| GNSS-ID-BDS | The field may be present if the GNSS-ID = bds; otherwise it is not present. |
| GNSS-ID-GLO | The field may be present if the GNSS ID = glonass; otherwise it is not present. |
| RTK-RST | The field may be present if gnss-RTK-Observations is present, otherwise it is not present |

[ ... ]
6.5.2.2 GNSS Assistance Data Elements [ ... ]
GNSS-RTK-Observations

The IE GNSS-RTK-Observations is used by the location server to provide GNSS reference station observables (pseudorange, phaserange, phaserange-rate (Doppler), and carrier-to-noise ratio) of the GNSS signals. Essentially, these parameters describe the range and derivatives from respective satellites to the reference station location provided in IE GNSS-RTK-ReferenceStationInfo at the reference time GNSS-SystemTime provided in IE GNSS-ReferenceTime. Whenever GNSS-RTK-Observations is provided by the location server, the IE GNSS-Reference Time shall be provided as well.

The parameters provided in IE GNSS-RTK-Observations are used as specified for message type 1071-1127 in [30].

```
—ASN1START
GNSS-RTK-Observations-r15 ::= SEQUENCE (SIZE(1..64)) OF GNSS-RTK-SatelliteDataElement-r15
GNSS-RTK-SatelliteDataElement-r15 ::= SEQUENCE{
    svID-r15                            SV-ID,
    integer-ms-r15                      INTEGER (0..254),
    rough-range-r15                     INTEGER (0..1023),
    rough-phase-range-rate-r15          INTEGER (-8192..8191)               OPTIONAL,
    gnss-rtk-SatelliteSignalDataList-r15    GNSS-RTK-SatelliteSignalDataList-r15,
    ...
}
GNSS-RTK-SatelliteSignalDataList-r15 ::= SEQUENCE (SIZE(1..24)) OF
                                            GNSS-RTK-SatelliteSignalDataElement-r15
GNSS-RTK-SatelliteSignalDataElement-r15 ::= SEQUENCE {
    gnss-SignalID-r15                   GNSS-SignalID,
    fine-PseudoRange-r15                INTEGER (-524288..524287),
```

-continued

| | | |
|---|---|---|
| fine-PhaseRange-r15 | INTEGER (−8388608..8388607), | |
| lockTimeIndicator-r15 | INTEGER (0..1023), | |
| halfCycleAmbiguityIndicator-r15 | BIT STRING (SIZE (1)), | |
| carrier-to-noise-ratio-r15 | INTEGER (0..1023) | OPTIONAL, |
| fine-PhaseRangeRate-r15 | INTEGER (−16384..16383) | OPTIONAL, |
| . . . | | |
| } | | |
| —ASN1STOP | | |

GNSS-RTK-Observations field descriptions svID
This field specifies the GNSS SV-ID of the satellite for which the GNSS Observations are provided.
integer-ms
This field contains the integer number of milliseconds in the satellite rough range. Rough range can be used to restore complete observables for a given satellite.
Scale factor 1 milli-second in the range from 0 to 254 milli-seconds.
rough-range
This field contains the sub-milliseconds in the satellite rough range (modulo 1 millisecond).
Scale factor $2^{-10}$ milli-seconds in the range from 0 to $(1-2^{-10})$ milli-seconds.
rough-phase-range-rate
This field contains the GNSS satellite rough phaserange rate.
Scale factor 1 m/s. Range ± 8191 m/s.
gnss-SignalID
This field specifies the GNSS signal for which the GNSS observations are provided.
fine-PseudoRange
This field contains the GNSS signal fine pseudorange.
Being added to fields integer-ms and rough-range allows getting the full pseudorange observable corresponding to given signal. NOTE 1.
Scale factor $2^{-29}$ milli-seconds. Range ± $(2^{-10}-2^{-20})$ milli-seconds.
fine-PhaseRange
This field contains the GNSS signal fine phaserange.
Being added to fields integer-ms and rough-range allows getting the full phaserange observable corresponding to given signal. NOTE 2.
Scale factor $2^{-31}$ milli-seconds. Range ± $(2^{-8}-2^{-31})$ milli-seconds.
lockTimeIndicator
This field provides a measure of the amount of time during which the receiver has maintained continuous lock on that satellite signal. If a cycle slip occurs during the previous measurement cycle, the lock time indicator shall be reset to zero.
Mapping according to the table lockTimeIndicator value to interpretation lock-time relation shown below.
halfCycleAmbiguityIndicator
Value 0 indicates no half-cycle ambiguity. Value 1 indicates half-cycle ambiguity.
When providing phaserange with unresolved polarity encoding this bit shall be set to 1. A target device that is not capable of handling half-cycle ambiguities shall skip such phaserange observables. If polarity resolution forced phaserange to be corrected by half-a-cycle, then the lockTimeIndicator must be reset to zero, indicating that despite continuous tracking the final phaserange experienced non-continuity.
carrier-to-noise-ratio
This field provides the GNSS signal carrier-to-noise-ratio in dB-Hz.
Scale factor $2^{-4}$ dB-Hz in the range from 0.0625 to 63.9375 dB-Hz.
fine-PhaseRangeRate
This field contains the GNSS signal fine Phase Range Rate.
Full phaserange rate is the sum of this field and the rough-phase-range-rate field. NOTE 3.
Scale factor 0.0001 m/s. Range ± 1.6383 m/s.

NOTE 1:
Complete Pseudorange for each signal (i) of given satellite can be restored as follows: Pseudorange(i) = c/1000 × (integer-ms + rough_range/1024 + $2^{-29}$ × fine_Pseudorange(i)), meter.
NOTE 2:
Complete Phaserange for each signal (i) of given satellite can be restored as follows: Phaserange(i) = c/1000 × (integer-ms + rough_range/1024 + $2^{-31}$ × fine_Phaserange(i)), meter.
NOTE 3:
Complete PhaseRangeRate for each signal (i) of given satellite can be restored as follows: PhaseRangeRate(i) = rough-phase-range-rate + 0.0001*fine-PhaseRangeRate (i), meter/sec.
NOTE 4:
The speed of light c is 299,792,458 meters per second.

lockTimeIndicator value to interpretation lock-time relation

| Indicator (i) | Supplementary coefficient (k) | Minimum Lock Time (ms) | Range of Indicated Lock Times (t) (ms) |
|---|---|---|---|
| 0-63 | 1 | i | 0 ≤ t < 64 |
| 64-95 | 2 | 2 × i − 64 | 64 ≤ t < 128 |
| 96-127 | 4 | 4 × i − 256 | 128 ≤ t < 256 |
| 128-159 | 8 | 8 × i − 768 | 256 ≤ t < 512 |

-continued lockTimeIndicator value to interpretation lock-time relation

| Indicator (i) | Supplementary coefficient (k) | Minimum Lock Time (ms) | Range of Indicated Lock Times (t) (ms) |
|---|---|---|---|
| 160-191 | 16 | 16 × i − 2048 | 512 ≤ t < 1024 |
| 192-223 | 32 | 32 × i − 5120 | 1024 ≤ t < 2048 |
| 224-255 | 64 | 64 × i − 12288 | 2048 ≤ t < 4096 |
| 256-287 | 128 | 128 × i − 28672 | 4096 ≤ t < 8192 |
| 288-319 | 256 | 256 × i − 65536 | 8192 ≤ t < 16384 |
| 320-351 | 512 | 512 × i − 147456 | 16384 ≤ t < 32768 |
| 352-383 | 1024 | 1024 × i − 327680 | 32768 ≤ t < 65536 |
| 384-415 | 2048 | 2048 × i − 720896 | 65536 ≤ t < 131072 |
| 416-447 | 4096 | 4096 × i − 1572864 | 131072 ≤ t < 262144 |
| 448-479 | 8192 | 8192 × i − 3407872 | 262144 ≤ t < 524288 |
| 480-511 | 16384 | 16384 × i − 7340032 | 524288 ≤ t < 1048576 |
| 512-543 | 32768 | 32768 × i − 15728640 | 1048576 ≤ t < 2097152 |
| 544-575 | 65536 | 65536 × i − 33554432 | 2097152 ≤ t < 4194304 |
| 576-607 | 131072 | 131072 × i − 71303168 | 4194304 ≤ t < 8388608 |
| 608-639 | 262144 | 262144 × i − 150994944 | 8388608 ≤ t < 16777216 |
| 640-671 | 524288 | 524288 × i − 318767104 | 16777216 ≤ t < 33554432 |
| 672-703 | 1048576 | 1048576 × i − 671088640 | 33554432 ≤ t < 67108864 |
| 704 | 2097152 | 2097152 × i − 1409286144 | 67108864 ≤ t |
| 705-1023 | | Reserved | |

GNSS-RTK-RStransferInfo

The IE GNSS-RTK-RStransferInfo is used by the location server to provide GNSS reference station transfer information to a target device to enable the device to transfer the integer ambiguity solution associated to a current reference station to a new reference station. The transfer information is provided as a double difference of the integer parts associated to both the current and new reference stations as well as for each satellite and a reference satellite.

```
—ASN1START
GNSS-RTK-RStransferInfo-r15 ::= SEQUENCE{
    currentStationID-r15            GNSS-ReferenceStationID-r15,
    newStationID-r15                GNSS-ReferenceStationID-r15,
    svIDref-r15                     SV-ID,
    gnss-rtk-RStransferInfoList-r15 GNSS-RTK-RStransferInfoList-r15,
    ...
}
GNSS-RTK-RStransferInfoList-r15 ::= SEQUENCE (SIZE(1..63)) OF
                                        GNSS-RTK-RStransferInfoListElement-r15
GNSS-RTK-RStransferInfoListElement-r15 ::= SEQUENCE {
    svID-r15                        SV-ID,
    gnss-rtk-RStransferDataList-r15 GNSS-RTK-RStransferDataList-r15
    ...
}
GNSS-RTK-RStransferDataList-r15 ::= SEQUENCE (SIZE(1..24)) OF
                                        GNSS-RTK-RStransferDataListElement-r15
GNSS-RTK-RStransferDataListElement ::= SEQUENCE {
    gnss-SignalID-r15               GNSS-SignalID,
    rsTransferInteger               INTEGER (−127..128),
    ...
}
—ASN1STOP
```

GNSS-RTK-Observations field descriptions svIDref
This field specifies the GNSS SV-ID of the satellite used as reference of the reference station transfer information for the integer ambiguity solution.
svID
This field specifies the GNSS SV-ID of any satellite except the reference satellite and is used to identify the satellite to which the reference station transfer information is associated to.
currentStationID
The ID of the current reference stations, i.e. the reference station the target device is transferring from
newStationID
The ID of the new reference stations, i.e. the reference station the target device is transferring to
gnss-SignalID
This field specifies the GNSS signal for which the reference station transfer information is associated to.
rsTransferInteger

| GNSS-RTK-Observations field descriptions |
|---|
| The double difference integer ambiguity solution transfer information, that transfers the double difference integer ambiguity solution associated to the current reference station and the device to the double difference integer ambiguity solution associated to the new reference station. |

[ . . . ]
6.5.2.4 GNSS Assistance Data Request Elements
[ . . . ]
GNSS-RTK-ObservationsReq The IE GNSS-RTK-ObservationsReq is used by the target device to request the GNSS-RTK-Observations assistance from the location server.

```
—ASN1START
GNSS-RTK-ObservationsReq-r15::= SEQUENCE {
    gnss-RTK-SignalsReq-r15         GNSS-SignalIDs,
    gnss-RTK-PhaseRangeRateReq-r15  BOOLEAN,
    gnss-RTK-CNR-Req-r15            BOOLEAN,
    stationID-r15                   GNSS-ReferenceStationID-r15 OPTIONAL,
    currStationID-r15               GNSS-ReferenceStationID-r15 OPTIONAL,
    gnss-RTK-RStransferInfoReq-r15  BOOLEAN                     OPTIONAL,
    ...
}
—ASN1STOP
```

| GNSS-RTK-ObservationsReq field descriptions |
|---|
| gnss-RTK-SignalsReq<br>This field specifies the GNSS Signal(s) for which the GNSS-RTK-Observations are requested. A one-value at a bit position means RTK observations for the specific signal are requested; a zero-value means not requested.<br>gnss-RTK-PhaseRangeRateReq<br>This field specifies whether the rough-phase-range-rate and fine-PhaseRangeRate are requested or not. TRUE means requested.<br>gnss-RTK-CNR-Req<br>This field specifies whether the carrier-to-noise-ratio is requested or not. TRUE means requested.<br>stationID<br>This field specifies the Station ID for which the GNSS-RTK-Observations are requested.<br>currStationID<br>This field specifies the Station ID for which the GNSS-RTK-Observations have been requested up until now.<br>gnss-RTK-RStransferInfoReq<br>This field specifies whether the reference station transfer information is requested or not TRUE means requested. |

With respect to periodic assistance data, the GNSS-PeriodicAssistData IE has been introduced in the running change request with a type from the IE GNSS-PeriodicAssistDataReq. One proposal is to correct the GNSS-PeriodicAssistData IE as shown below in the text proposal to 3GPP TS 36.355:

Text Proposal for TS 36.355

GNSS-PeriodicAssistData

The IE GNSS-PeriodicAssistData is used by the location server to provide control parameters for a periodic assistance data delivery session (e.g., interval and duration) to the target device.

NOTE: Omission of a particular assistance data type field in IE GNSS-PeriodicAssistData means that the location server does not provide this assistance data type in a data transaction of a periodic assistance data delivery session, as described in sub-clauses 5.2.1a and 5.2.2a. Inclusion of no assistance data type fields in IE GNSS-PeriodicAssistData means that a periodic assistance data delivery session is terminated.

```
—ASN1START
GNSS-PeriodicAssistData-r15 ::= SEQUENCE {
    gnss-RTK-PeriodicObservations-r15 GNSS-PeriodicControlParam-r15 OPTIONAL, -- Need ON glo-RTK-PeriodicBiasInformation-r15 GNSS-PeriodicControlParam-r15 OPTIONAL, -- Need ON gnss-RTK-MAC-PeriodicCorrectionDifferences-r15
```

| | | | |
|---|---|---|---|
| ~~gnss-RTK-PeriodicResiduals-r15~~ | ~~GNSS-PeriodControlParam-r15~~ | ~~OPTIONAL,~~ | ~~—Need ON~~ |
| ~~gnss-RTK-FKP-PeriodicGradients-r15~~ | ~~GNSS-PeriodicControlParam-r15~~ | ~~OPTIONAL,~~ | ~~—Need ON~~ |
| ~~gnss-SSR-PeriodicOrbitCorrections-r15~~ | ~~GNSS-PeriodicControlParam-r15~~ | ~~OPTIONAL,~~ | ~~—Need ON~~ |
| ~~gnss-SSR-PeriodicClockCorrections-r15~~ | ~~GNSS-PeriodicControlParam-r15~~ | ~~OPTIONAL,~~ | ~~—Need ON~~ |
| ~~gnss-SSR-PeriodicCodeBias-r15~~ | ~~GNSS-PeriodicControlParam-r15~~ | ~~OPTIONAL,~~ | ~~—Need ON~~ |
| gnss-RTK-PeriodicObservations-r15 | GNSS-RTK-Observations-r15 | OPTIONAL, | —Need ON |
| glo-RTK-PeriodicBiasInformation-r15 | GLO-RTK-BiasInformation-r15 | OPTIONAL, | —Need ON |
| gnss-RTK-MAC-PeriodicCorrectionDifferences-r15 | GNSS-RTK-MAC-CorrectionDifferences-r15 | OPTIONAL, | —Need ON |
| gnss-RTK-PeriodicResiduals-r15 | GNSS-RTK-Residuals-r15 | OPTIONAL, | —Need ON |
| gnss-RTK-FKP-PeriodicGradients-r15 | GNSS-RTK-FKP-Gradients-r15 | OPTIONAL, | —Need ON |
| gnss-SSR-PeriodicOrbitCorrections-r15 | GNSS-SSR-OrbitCorrections-r15 | OPTIONAL, | —Need ON |
| gnss-SSR-PeriodicClockCorrections-r15 | GNSS-SSR-ClockCorrections-r15 | OPTIONAL, | —Need ON |
| gnss-SSR-PeriodicCodeBias-r15 | GNSS-SSR-CodeBias-r15 | OPTIONAL, | —Need ON |

}

—ASN1STOP

Thus, certain of the embodiments described herein can be incorporated into the standard by adopting one or more of the following proposals described above: extending GNSS-RTK-ReferenceStationInfo and GNSS-RTK-CommonObservationInfo information elements to include up to N number of reference stations; using N=32; extending GNSS-RTK-Observations, GLO-RTK-BiasInformation, GNSS-RTK-PeriodicObservations and GLO-RTK-PeriodicBiasInformation information elements to include up to M number of reference stations; using M=32; defining signalling to enable the UE to translate its integer ambiguity solution associated to a current reference station to an integer solution associated to a new reference station; and introducing the text proposals set forth above.

Figure 5:
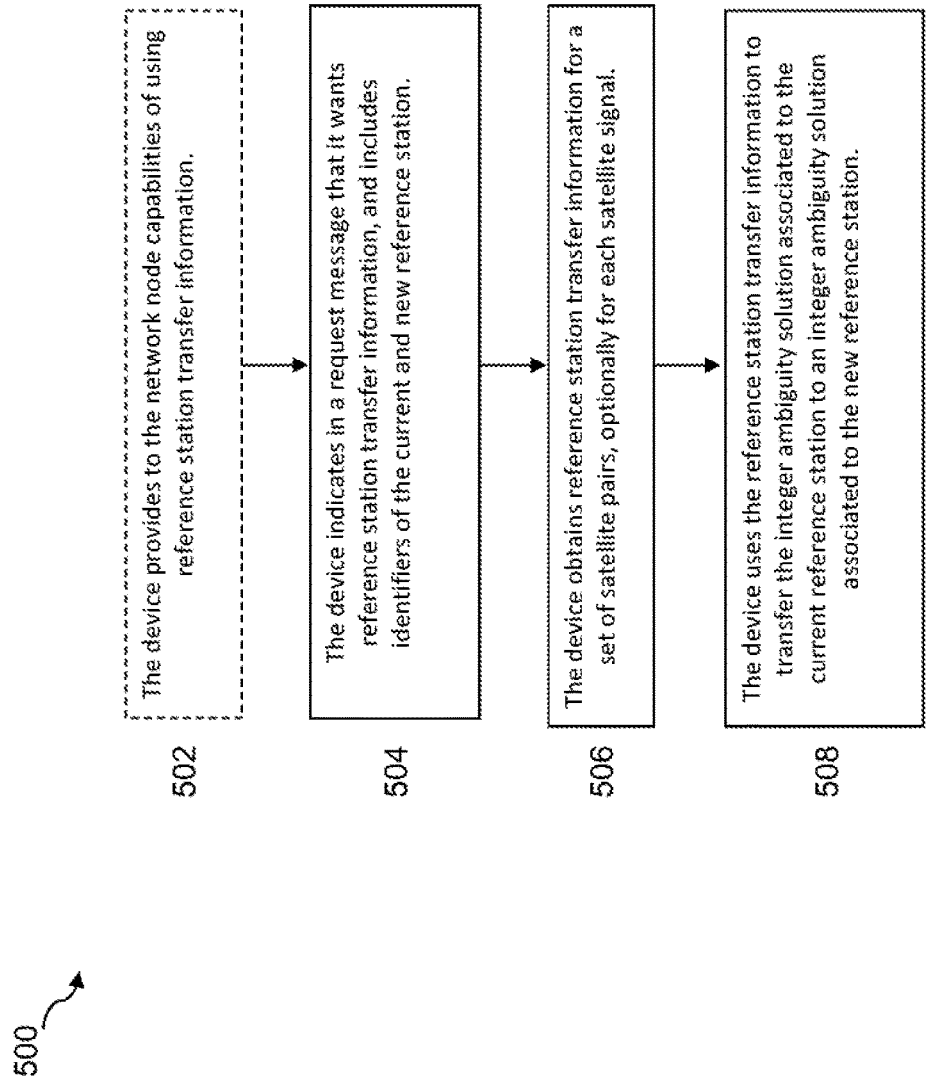
FIG. 5 is a flowchart of a method in a wireless device, in accordance with certain embodiments.

FIG. 5 is a flowchart of a method in a wireless device, in accordance with certain embodiments. In the example of FIG. 5, the method begins at step 502, where the wireless device (e.g., a UE) optionally provides to the network node its capabilities of using reference station transfer information.

At step 504, the wireless device provides to the network node an indication about the desired reference station transfer information. For example, the wireless device may send a request to the network node indicating that the wireless device wants reference station transfer information. The request may include identifiers of the current reference station and a new reference station. In return, at step 506 the wireless device obtains reference station transfer information for a set of satellite pairs, optionally also for each satellite signal, and for one or more GNSS systems. At step 508, based on the transfer information, the device transfers the integer ambiguity solution associated to the current reference station to an integer ambiguity solution associated to a new reference station. In certain embodiments, the wireless device uses the integer ambiguity solution associated to the new reference station together with carrier phase observations from the new reference station, to estimate its position accurately.

Figure 6:
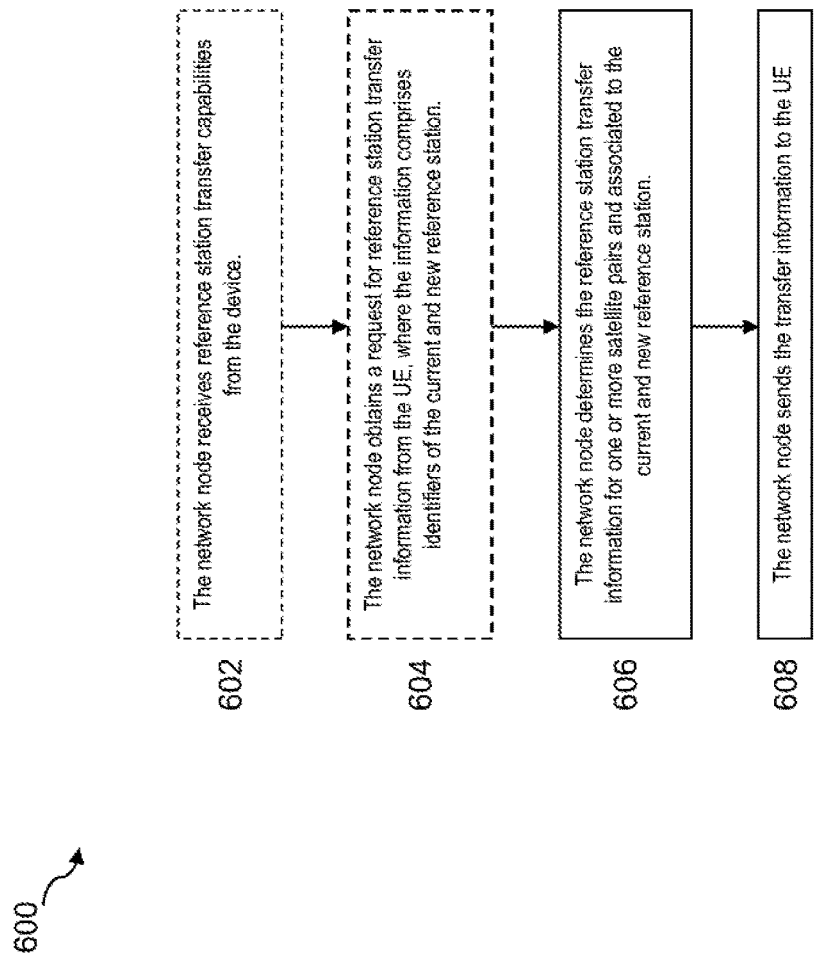
FIG. 6 is a flowchart of a method in a network node, in accordance with certain embodiments.

FIG. 6 is a flowchart of a method in a network node, in accordance with certain embodiments. In certain embodiments, the network node may be a location server (e.g., E-SMLC). In the example of FIG. 6, method 600 beings at step 602, where, optionally, the network node receives the supported transfer information capabilities from a wireless device (e.g., a UE). In certain embodiments, optionally at step 604 the network node obtains (e.g., receives) a request for reference station transfer information from the UE. The request for reference station transfer information may include identifiers of the current and new reference stations. At step 606, the network node determines the reference station transfer information for one or more satellite pairs and associated to the current and new reference station (e.g., as described above in relation to FIG. 4). At step 608, the network node sends the reference station transfer information to the UE.

Figure 7:
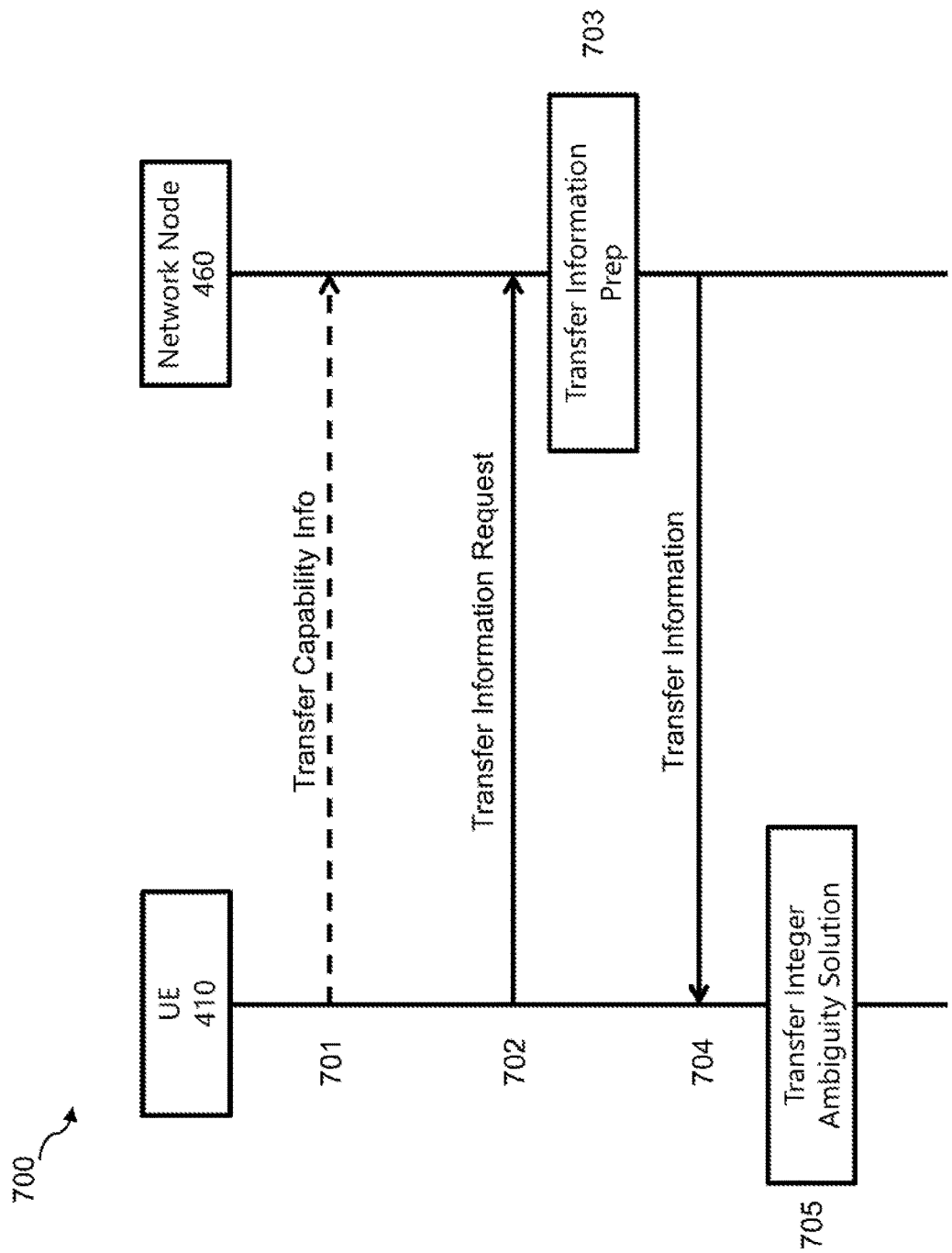
FIG. 7 is a signalling flow diagram, in accordance with certain embodiments.

FIG. 7 is a signalling flow diagram, in accordance with certain embodiments. More particularly, FIG. 7 illustrates the exchange of signals between a UE (e.g., UE 410 described above in relation to FIG. 4) and a network node (e.g., network node 460 described above in relation to FIG. 4). Network node 460 may be a location server.

Optionally, at step 701, UE 410 sends reference station transfer information capability information to network node 460. The capability information may indicate a capability of UE 410 to use reference station transfer information. Network node 460 receives the capability information.

At step 702, UE 410 sends a request for reference station transfer information that is received by network node 460. In certain embodiments, the request for reference station transfer information may be sent in response to a determination that UE 410 needs to change from the current reference station to the new reference station. The request for reference station transfer information may include an identifier of the current reference station and/or an identifier of the new reference station. In some cases, one or more of the current reference station and the new reference station may be a virtual reference station. The reference station transfer information may be included in a GNSS-RTK-ObservationsReq information element. Network node 460 receives the request for reference station transfer information from UE 410.

At step 703, network node 460 determines the reference station transfer information. In certain embodiments, network node 460 determines reference station transfer information for at least one pair of satellites associated with the current reference station of the UE 410 and the new reference station of UE 410. In certain embodiments, network node 460 may determine the reference station transfer information in response to the request for reference station transfer information described above in relation to step 702. The reference station transfer information may include reference station transfer information for a first satellite of a first satellite in the satellite pair and reference station transfer information for a second satellite signal of a second satellite in the satellite pair. The reference station transfer information may include reference station transfer information for one or more global navigation satellite systems. In certain embodiments, the reference station transfer information may include a double difference of an integer ambiguity solution associated with the current reference station and an integer ambiguity solution associated with the new reference station.

At step 704, network node 460 sends the determined reference station transfer information to UE 410. The reference station transfer information may be sent in a GNSS-RTK-RStransferInfo information element. UE 410 obtains (e.g., receives) the determined reference station transfer information sent by network node 460.

At step 705, UE 410 determines an integer ambiguity solution associated with a new reference station based on the obtained reference station transfer information and an integer ambiguity solution associated with a current reference station. In certain embodiments, the wireless device estimates its position based on the integer ambiguity solution associated with the new reference station and one or more carrier phase observations from the new reference station.

Figure 8:
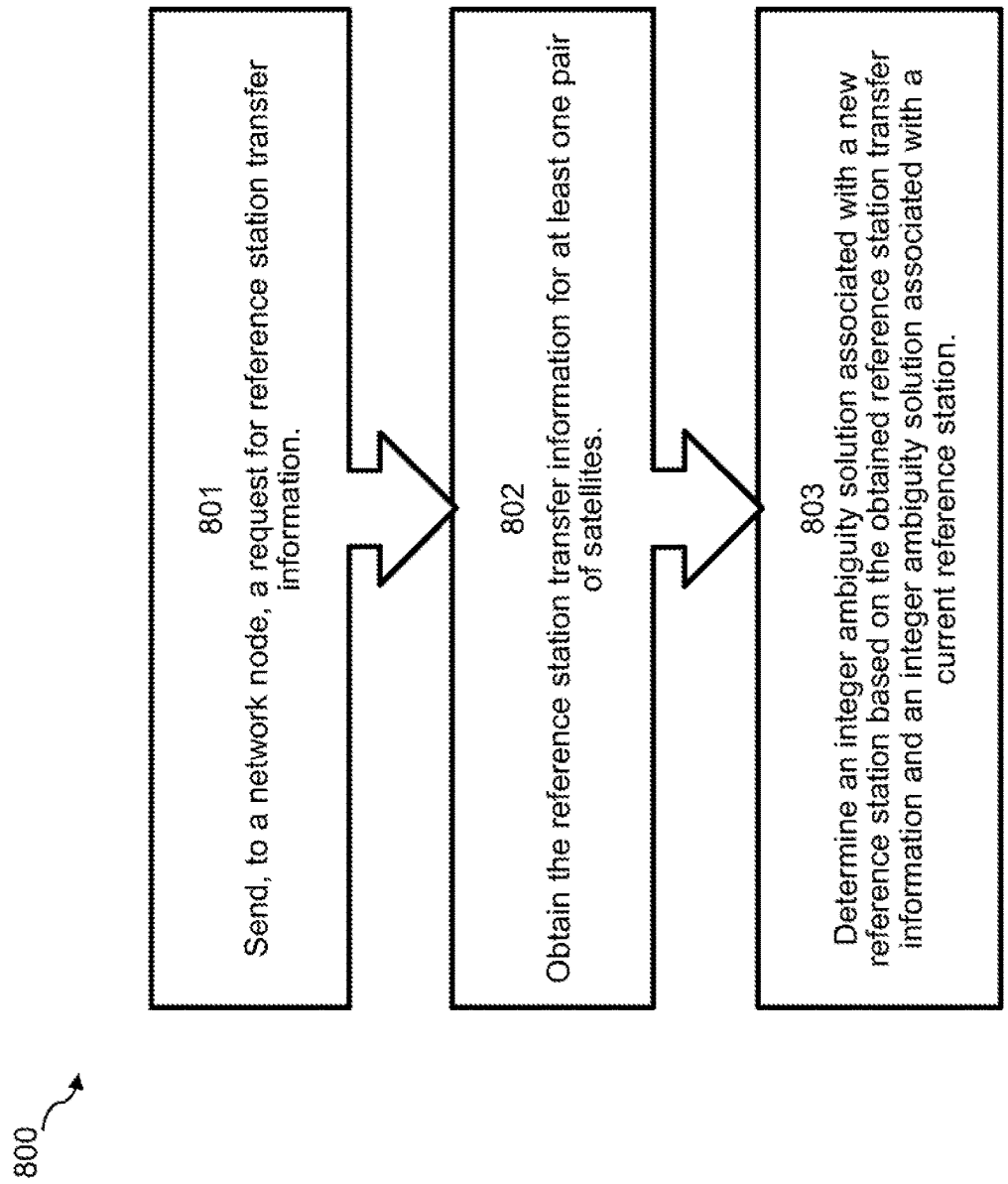
FIG. 8 is a flowchart of a method in a wireless device, in accordance with certain embodiments.

FIG. 8 is a flowchart of a method in a wireless device, in accordance with certain embodiments. Method 800 begins at step 801, where the wireless device sends, to a network node, a request for reference station transfer information. In certain embodiments, the network node may comprise a location server.

In certain embodiments, the method may further comprise sending capability information to the network node, the capability information indicating a capability of the wireless device to use reference station transfer information.

In certain embodiments, the request for reference station transfer information may comprise an identifier of the current reference station. In certain embodiments, the request for reference station transfer information may comprise an identifier of the new reference station. In certain embodiments, one or more of the current reference station and the new reference station may be a virtual reference station.

In certain embodiments, the request for reference station transfer information may be sent in response to a determination that the wireless device needs to change from the current reference station to the new reference station. In certain embodiments, the request for reference station transfer information may be included in a GNSS-RTK-ObservationsReq information element.

At step 802, the wireless device obtains the reference station transfer information for at least one pair of satellites. In certain embodiments, the obtained reference station transfer information may comprise: reference station transfer information for a first satellite signal of a first satellite in the satellite pair; and reference station transfer information for a second satellite signal of a second satellite in the satellite pair. In certain embodiments, the obtained reference station transfer information comprises reference station transfer information for one or more global navigation satellite systems. In certain embodiments, the obtained reference station transfer information may comprise a double difference of the integer ambiguity solution associated with the current reference station and the integer ambiguity solution associated with the new reference station. In certain embodiments, the reference station transfer information may be obtained from a GNSS-RTK-RStransferInfo information element.

At step 803, the wireless device determines an integer ambiguity solution associated with a new reference station based on the obtained reference station transfer information and an integer ambiguity solution associated with a current reference station.

In certain embodiments, the method may further comprise estimating a position of the wireless device based on the integer ambiguity solution associated with the new reference station and one or more carrier phase observations from the new reference station.

Figure 9:
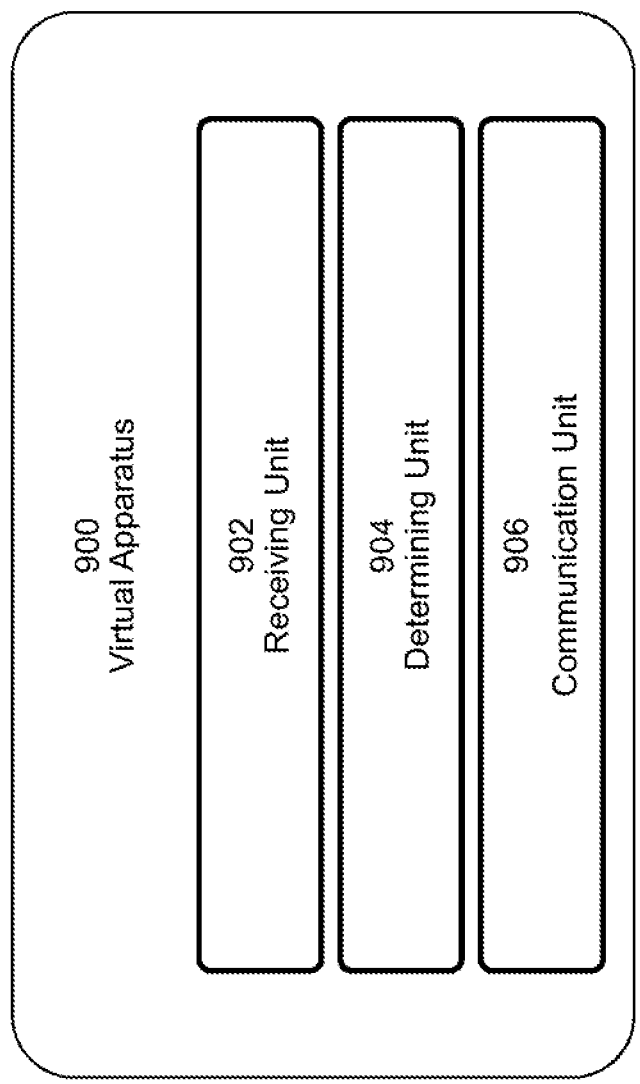
FIG. 9 is a schematic block diagram of a virtualization apparatus, in accordance with certain embodiments.

FIG. 9 is a schematic block diagram of a virtualization apparatus, in accordance with certain embodiments. More particularly, FIG. 9 illustrates a schematic block diagram of an apparatus 900 in a wireless network (for example, the wireless network shown in FIG. 4). The apparatus may be implemented in a wireless device (e.g., wireless device 410 shown in FIG. 4). Apparatus 900 is operable to carry out the example method described with reference to FIG. 8 and possibly any other processes or methods disclosed herein. It is also to be understood that the method of FIG. 8 is not necessarily carried out solely by apparatus 900. At least some operations of the method can be performed by one or more other entities.

Virtual Apparatus 900 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving unit 902, determining unit 904, and communication unit 906, and any other suitable units of apparatus 800 to perform corresponding functions according one or more embodiments of the present disclosure.

In certain embodiments, apparatus 900 may be a wireless device (e.g., a UE). As illustrated in FIG. 9, apparatus 900 includes receiving unit 902, determining unit 904, and communication unit 906. Receiving unit 902 may be configured to perform the receiving functions of apparatus 900. For example, receiving unit 902 may be configured to obtain the reference station transfer information (e.g., for at least one pair of satellites).

Receiving unit 902 may receive any suitable information (e.g., from a network node or another wireless device). Receiving unit 902 may include a receiver and/or a transceiver, such as RF transceiver circuitry 422 described above in relation to FIG. 4. Receiving unit 902 may include circuitry configured to receive messages and/or signals (wireless or wired). In particular embodiments, receiving unit 902 may communicate received messages and/or signals to determining unit 904 and/or any other suitable unit of apparatus 900. The functions of receiving unit 902 may, in certain embodiments, be performed in one or more distinct units.

Determining unit 904 may be configured to perform the processing functions of apparatus 900. In certain embodiments, determining unit 904 may be configured to use the obtained reference station transfer information to transfer an integer ambiguity solution associated to a current reference station to an integer ambiguity solution associated with a new reference station. Determining unit 904 may be configured to determine an integer ambiguity solution associated with a new reference station based on the obtained reference station transfer information and an integer ambiguity solution associated with a current reference station. As another example, determining unit 904 may be configured to estimate a position of the wireless device based on the integer ambiguity solution associated with the new reference station and one or more carrier phase observations from the new reference station. As still another example, determining unit 904 may be configured to provide user data.

Determining unit 904 may include or be included in one or more processors, such as processing circuitry 420 described above in relation to FIG. 4. Determining unit 904 may include analog and/or digital circuitry configured to perform any of the functions of determining unit 904 and/or processing circuitry 420 described above. The functions of determining unit 904 may, in certain embodiments, be performed in one or more distinct units.

Communication unit 906 may be configured to perform the transmission functions of apparatus 900. For example, communication unit 906 may be configured to send, to a network node, a request for reference station transfer information. As another example, communication unit 906 may be configured to send capability information to the network node, the capability information indicating a capability of the wireless device to use reference station transfer information. As still another example, communication unit 906 may be configured to forward the user data to a host computer via a transmission to the network node.

Communication unit 906 may include a transmitter and/or a transceiver, such as RF transceiver circuitry 422 described above in relation to FIG. 4. Communication unit 906 may include circuitry configured to transmit messages and/or signals (e.g., through wireless or wired means). In particular embodiments, communication unit 906 may receive messages and/or signals for transmission from determining unit 904 or any other unit of apparatus 900. The functions of communication unit 904 may, in certain embodiments, be performed in one or more distinct units.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Figure 10:
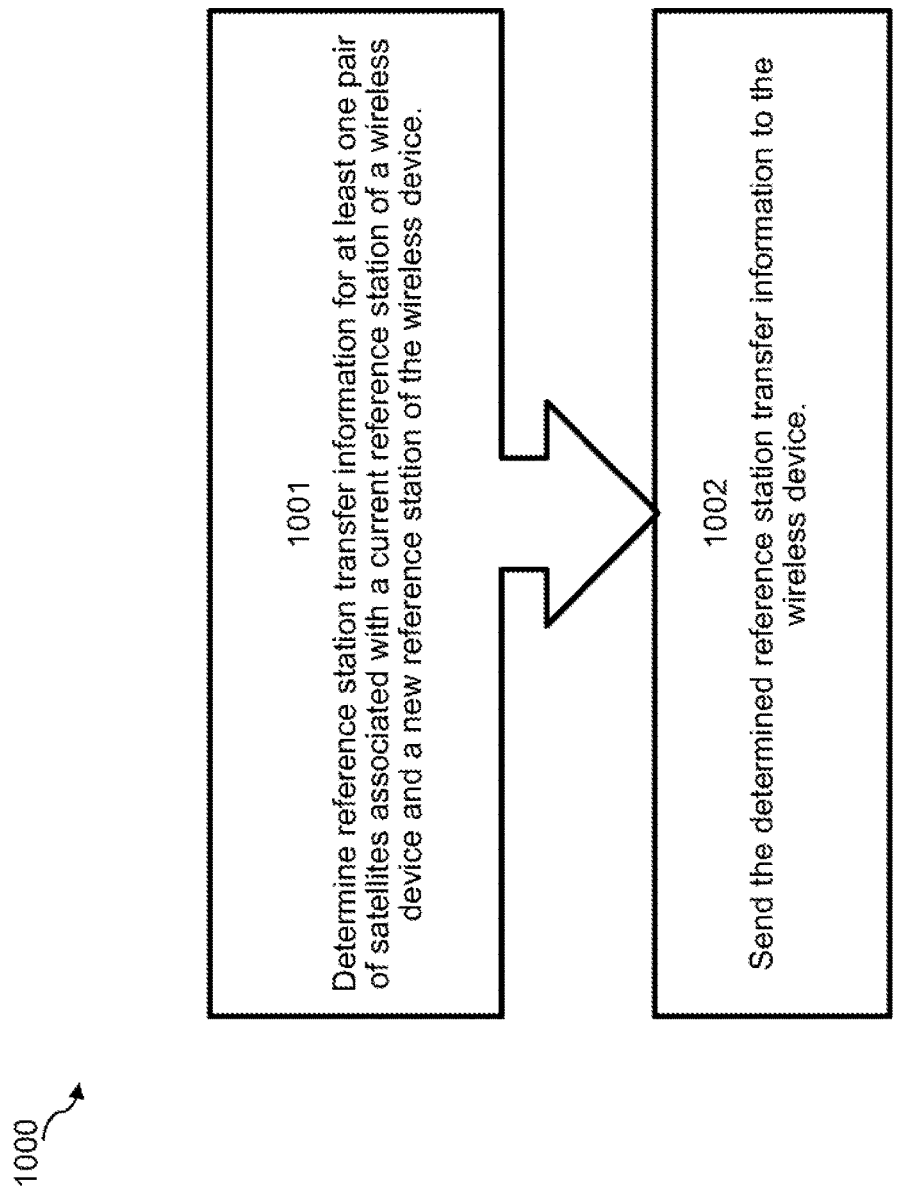
FIG. 10 is a flowchart of a method in a network node, in accordance with certain embodiments.

FIG. 10 is a flowchart of a method in a network node, in accordance with certain embodiments. Method 1000 begins at step 1001, where the network node determines reference station transfer information for at least one pair of satellites associated with a current reference station of a wireless device and a new reference station of the wireless device. In certain embodiments, the network node may comprise a location server. In certain embodiments, one or more of the current reference station and the new reference station may be a virtual reference station.

In certain embodiments, the method may further comprise receiving capability information for the wireless device, the capability information indicating a capability of the wireless device to use reference station transfer information.

In certain embodiments, the method may further comprise receiving a request for the reference station transfer information from the wireless device. The reference station transfer information may be determined in response to the request. In certain embodiments, the request for the reference station transfer information may comprise an identifier of the current reference station. In certain embodiments, the request for the reference station transfer information may comprise an identifier of the new reference station. In certain embodiments, the request for the reference station transfer information may be included in a GNSS-RTK-ObservationsReq information element.

In certain embodiments, the reference station transfer information may comprise: reference station transfer information for a first satellite signal of a first satellite in the satellite pair; and reference station transfer information for a second satellite signal of a second satellite in the satellite pair. In certain embodiments, the reference station transfer information may comprise reference station transfer information for one or more global navigation satellite systems. In certain embodiments, the reference station transfer information may comprise a double difference of an integer ambiguity solution associated with the current reference station and an integer ambiguity solution associated with the new reference station.

At step 1002, the network node sends the determined reference station transfer information to the wireless device. In certain embodiments, the reference station transfer information may be sent in a GNSS-RTK-RStransferInfo information element.

In certain embodiments, the reference station transfer information may enable the wireless device to: determine the integer ambiguity solution associated with the new reference station based on the reference station transfer information and the integer ambiguity solution associated with the current reference station; and estimate a position of the wireless device based on the integer ambiguity solution associated with the new reference station and one or more carrier phase observations from the new reference station.

Figure 11:
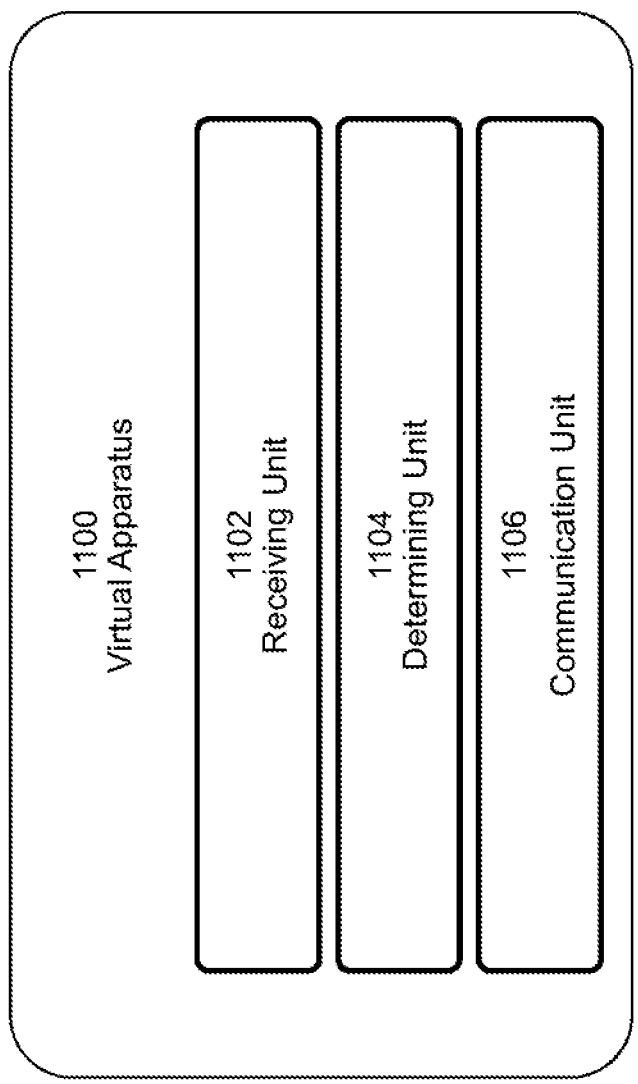
FIG. 11 is a schematic block diagram of a virtualization apparatus, in accordance with certain embodiments.

FIG. 11 is a schematic block diagram of a virtualization apparatus, in accordance with certain embodiments. More particularly, FIG. 11 illustrates a schematic block diagram of an apparatus 1100 in a wireless network (for example, the wireless network shown in FIG. 4). The apparatus may be implemented in a network node (e.g., network node 460 shown in FIG. 4). Apparatus 1100 is operable to carry out the example method described with reference to FIG. 10 and possibly any other processes or methods disclosed herein. It is also to be understood that the method of FIG. 10 is not necessarily carried out solely by apparatus 1100. At least some operations of the method can be performed by one or more other entities.

Virtual Apparatus 1100 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving unit 1102, determining unit 1104, and communication unit 1106, and any other suitable units of apparatus 1100 to perform corresponding functions according one or more embodiments of the present disclosure.

In certain embodiments, apparatus 1100 may be a location server. As illustrated in FIG. 11, apparatus 1100 includes receiving unit 1102, determining unit 1104, and communication unit 1106. Receiving unit 1102 may be configured to perform the receiving functions of apparatus 1100. For example, receiving unit 1102 may be configured to receive a request for reference station transfer information from the wireless device. As another example, receiving unit 1102 may be configured to receive capability information for the wireless device, the capability information indicating a capability of the wireless device to use reference station transfer information. As another example, receiving unit 1102 may obtain user data.

Receiving unit 1102 may receive any suitable information (e.g., from a wireless device or another network node). Receiving unit 1102 may include a receiver and/or a transceiver, such as RF transceiver circuitry 472 described above in relation to FIG. 4. Receiving unit 1102 may include circuitry configured to receive messages and/or signals (wireless or wired). In particular embodiments, receiving unit 1102 may communicate received messages and/or signals to determining unit 1104 and/or any other suitable unit of apparatus 1100. The functions of receiving unit 1102 may, in certain embodiments, be performed in one or more distinct units.

Determining unit 1104 may be configured to perform the processing functions of apparatus 1100. For example, determining unit 1104 may be configured to determine reference station transfer information for at least one pair of satellites associated with a current reference station of a wireless device and a new reference station of the wireless device. For instance, determining unit 1104 may be configured to determine a double difference of an integer ambiguity solution associated with the current reference station and an integer ambiguity solution associated with the new reference station. In certain embodiments, determining unit 1104 may be configured to determine reference station transfer information for a first satellite signal of a first satellite in the satellite pair and reference station transfer information for a second satellite signal of a second satellite in the satellite pair. In certain embodiments, determining unit 1104 may be configured to determine reference station transfer information for one or more global navigation satellite systems. In certain embodiments, determining unit 1104 may be configured to determine the reference station transfer information in response to a request.

Determining unit 1104 may include or be included in one or more processors, such as processing circuitry 470 described above in relation to FIG. 4. Determining unit 1104 may include analog and/or digital circuitry configured to perform any of the functions of determining unit 1104 and/or processing circuitry 470 described above. The functions of determining unit 1104 may, in certain embodiments, be performed in one or more distinct units.

Communication unit 1106 may be configured to perform the transmission functions of apparatus 1100. For example, communication unit 1106 may be configured to send the determined reference station transfer information to the wireless device. As another example, communication unit 1106 may be configured to forward the user data to a host computer or a wireless device.

Communication unit 1106 may transmit messages (e.g., to a wireless device and/or another network node). Communication unit 1106 may include a transmitter and/or a transceiver, such as RF transceiver circuitry 472 described above in relation to FIG. 4 Communication unit 1106 may include circuitry configured to transmit messages and/or signals (e.g., through wireless or wired means). In particular embodiments, communication unit 1106 may receive messages and/or signals for transmission from determining unit 1104 or any other unit of apparatus 1100. The functions of communication unit 1104 may, in certain embodiments, be performed in one or more distinct units.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Figure 12:
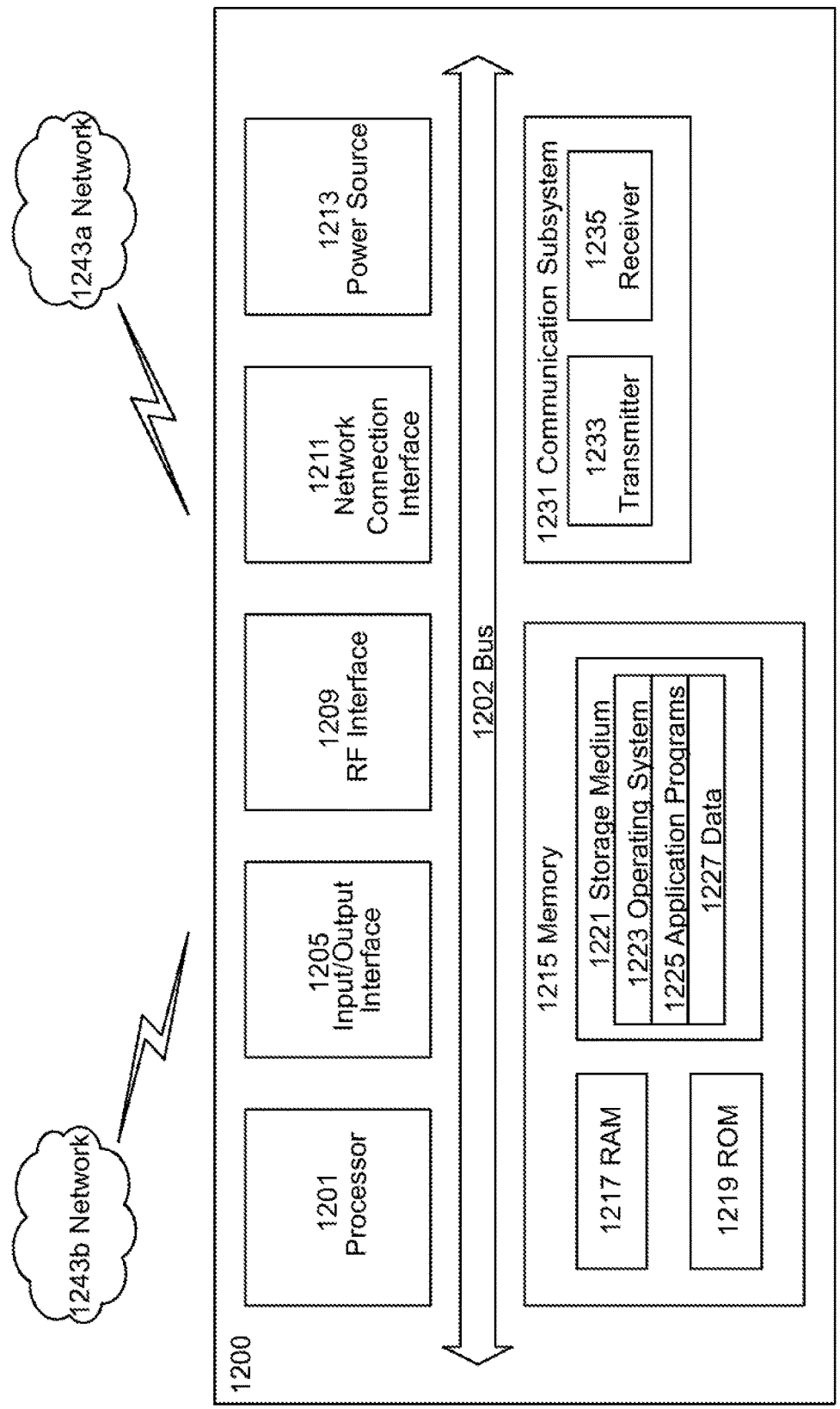
FIG. 12 illustrates one embodiment of a UE, in accordance with certain embodiments.

FIG. 12 illustrates one embodiment of a UE, in accordance with certain embodiments. FIG. 12 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 1200 may be any UE identified by the 3rd Generation Partnership Project (3GPP), including a NB-IoT UE, a machine type communication (MTC) UE, and/or an enhanced MTC (eMTC) UE. UE 1200, as illustrated in FIG. 12, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeably. Accordingly, although FIG. 12 is a UE, the components discussed herein are equally applicable to a WD, and vice-versa.

In FIG. 12, UE 1200 includes processing circuitry 1201 that is operatively coupled to input/output interface 1205, radio frequency (RF) interface 1209, network connection interface 1211, memory 1215 including random access memory (RAM) 1217, read-only memory (ROM) 1219, and storage medium 1221 or the like, communication subsystem 1231, power source 1233, and/or any other component, or any combination thereof. Storage medium 1221 includes operating system 1223, application program 1225, and data 1227. In other embodiments, storage medium 1221 may include other similar types of information. Certain UEs may utilize all of the components shown in FIG. 12, or only a subset of the components. The level of integration between the components may vary from one UE to another UE. Further, certain UEs may contain multiple instances of a component, such as multiple processors, memories, transceivers, transmitters, receivers, etc.

In FIG. 12, processing circuitry 1201 may be configured to process computer instructions and data. Processing circuitry 1201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1201 may include two central processing units (CPUs). Data may be information in a form suitable for use by a computer.

In the depicted embodiment, input/output interface 1205 may be configured to provide a communication interface to an input device, output device, or input and output device. UE 1200 may be configured to use an output device via input/output interface 1205. An output device may use the same type of interface port as an input device. For example, a USB port may be used to provide input to and output from UE 1200. The output device may be a speaker, a sound card, a video card, a display, a monitor, a printer, an actuator, an emitter, a smartcard, another output device, or any combination thereof. UE 1200 may be configured to use an input device via input/output interface 1205 to allow a user to capture information into UE 1200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 12, RF interface 1209 may be configured to provide a communication interface to RF components such as a transmitter, a receiver, and an antenna. Network connection interface 1211 may be configured to provide a communication interface to network 1243a. Network 1243a may encompass wired and/or wireless networks such as a local-area network (LAN), a wide-area network (WAN), a computer network, a wireless network, a telecommunications network, another like network or any combination thereof. For example, network 1243a may comprise a Wi-Fi network. Network connection interface 1211 may be configured to include a receiver and a transmitter interface used to communicate with one or more other devices over a communication network according to one or more communication protocols, such as Ethernet, TCP/IP, SONET, ATM, or the like. Network connection interface 1211 may implement receiver and transmitter functionality appropriate to the communication network links (e.g., optical, electrical, and the like). The transmitter and receiver functions may share circuit components, software or firmware, or alternatively may be implemented separately.

RAM 1217 may be configured to interface via bus 1202 to processing circuitry 1201 to provide storage or caching of data or computer instructions during the execution of software programs such as the operating system, application programs, and device drivers. ROM 1219 may be configured to provide computer instructions or data to processing circuitry 1201. For example, ROM 1219 may be configured to store invariant low-level system code or data for basic system functions such as basic input and output (I/O), startup, or reception of keystrokes from a keyboard that are stored in a non-volatile memory. Storage medium 1221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1221 may be configured to include operating system 1223, application program 1225 such as a web browser application, a widget or gadget engine or another application, and data file 1227. Storage medium 1221 may store, for use by UE 1200, any of a variety of various operating systems or combinations of operating systems.

Storage medium 1221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1221 may allow UE 1200 to access computer-executable instructions, application programs or the like, stored on transitory or non-transitory memory media, to off-load data, or to upload data. An article of manufacture, such as one utilizing a communication system may be tangibly embodied in storage medium 1221, which may comprise a device readable medium.

In FIG. 12, processing circuitry 1201 may be configured to communicate with network 1243b using communication subsystem 1231. Network 1243a and network 1243b may be the same network or networks or different network or networks. Communication subsystem 1231 may be configured to include one or more transceivers used to communicate with network 1243b. For example, communication subsystem 1231 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 1233 and/or receiver 1235 to implement transmitter or receiver functionality, respectively, appropriate to the RAN links (e.g., frequency allocations and the like). Further, transmitter 1233 and receiver 1235 of each transceiver may share circuit components, software or firmware, or alternatively may be implemented separately.

In the illustrated embodiment, the communication functions of communication subsystem 1231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1231 may include cellular communication, Wi-Fi communication, Bluetooth communication, and GPS communication. Network 1243b may encompass wired and/or wireless networks such as a local-area network (LAN), a wide-area network (WAN), a computer network, a wireless network, a telecommunications network, another like network or any combination thereof. For example, network 1243b may be a cellular network, a Wi-Fi network, and/or a near-field network. Power source 1213 may be configured to provide alternating current (AC) or direct current (DC) power to components of UE 1200.

The features, benefits and/or functions described herein may be implemented in one of the components of UE 1200 or partitioned across multiple components of UE 1200. Further, the features, benefits, and/or functions described herein may be implemented in any combination of hardware, software or firmware. In one example, communication subsystem 1231 may be configured to include any of the components described herein. Further, processing circuitry 1201 may be configured to communicate with any of such components over bus 1202. In another example, any of such components may be represented by program instructions stored in memory that when executed by processing circuitry 1201 perform the corresponding functions described herein. In another example, the functionality of any of such components may be partitioned between processing circuitry 1201 and communication subsystem 1231. In another example, the non-computationally intensive functions of any of such components may be implemented in software or firmware and the computationally intensive functions may be implemented in hardware.

Figure 13:
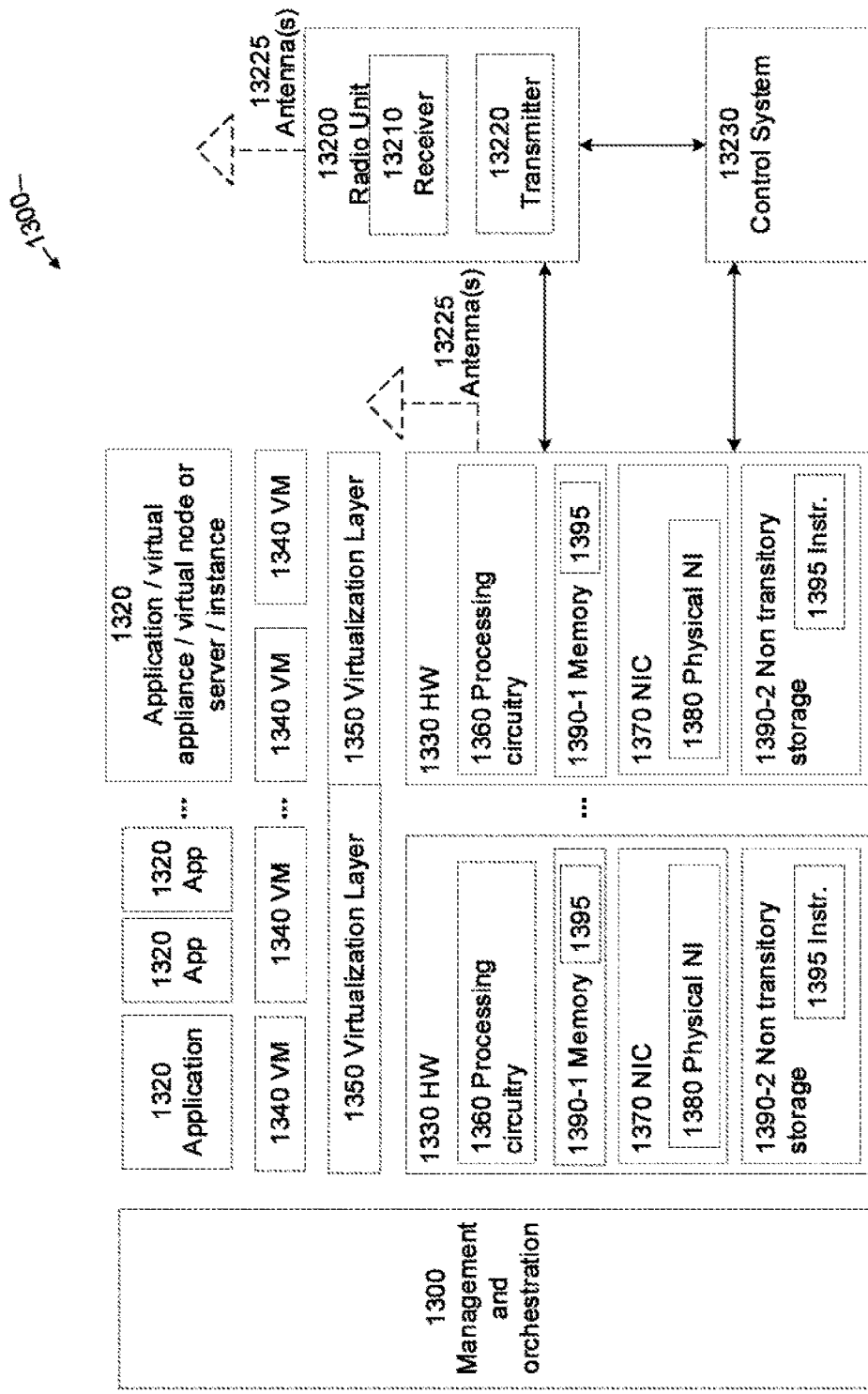
FIG. 13 is a schematic block diagram illustrating a virtualization environment, in accordance with certain embodiments.

FIG. 13 is a schematic block diagram illustrating a virtualization environment, in accordance with certain embodiments. FIG. 13 is a schematic block diagram illustrating a virtualization environment 1300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1300 hosted by one or more of hardware nodes 1330. Further, in embodiments in which the virtual node is not a radio access node or does not require radio connectivity (e.g., a core network node), then the network node may be entirely virtualized.

The functions may be implemented by one or more applications 1320 (which may alternatively be called software instances, virtual appliances, network functions, virtual nodes, virtual network functions, etc.) operative to implement some of the features, functions, and/or benefits of some of the embodiments disclosed herein. Applications 1320 are run in virtualization environment 1300 which provides hardware 1330 comprising processing circuitry 1360 and memory 1390. Memory 1390 contains instructions 1395 executable by processing circuitry 1360 whereby application 1320 is operative to provide one or more of the features, benefits, and/or functions disclosed herein.

Virtualization environment 1300, comprises general-purpose or special-purpose network hardware devices 1330 comprising a set of one or more processors or processing circuitry 1360, which may be commercial off-the-shelf (COTS) processors, dedicated Application Specific Integrated Circuits (ASICs), or any other type of processing circuitry including digital or analog hardware components or special purpose processors. Each hardware device may comprise memory 1390-1 which may be non-persistent memory for temporarily storing instructions 1395 or software executed by processing circuitry 1360. Each hardware device may comprise one or more network interface controllers (NICs) 1370, also known as network interface cards, which include physical network interface 1380. Each hardware device may also include non-transitory, persistent, machine-readable storage media 1390-2 having stored therein software 1395 and/or instructions executable by processing circuitry 1360. Software 1395 may include any type of software including software for instantiating one or more virtualization layers 1350 (also referred to as hypervisors), software to execute virtual machines 1340 as well as software allowing it to execute functions, features and/or benefits described in relation with some embodiments described herein.

Virtual machines 1340, comprise virtual processing, virtual memory, virtual networking or interface and virtual storage, and may be run by a corresponding virtualization layer 1350 or hypervisor. Different embodiments of the instance of virtual appliance 1320 may be implemented on one or more of virtual machines 1340, and the implementations may be made in different ways.

During operation, processing circuitry 1360 executes software 1395 to instantiate the hypervisor or virtualization layer 1350, which may sometimes be referred to as a virtual machine monitor (VMM). Virtualization layer 1350 may present a virtual operating platform that appears like networking hardware to virtual machine 1340.

As shown in FIG. 13, hardware 1330 may be a standalone network node with generic or specific components. Hardware 1330 may comprise antenna 13225 and may implement some functions via virtualization. Alternatively, hardware 1330 may be part of a larger cluster of hardware (e.g. such as in a data center or customer premise equipment (CPE)) where many hardware nodes work together and are managed via management and orchestration (MANO) 13100, which, among others, oversees lifecycle management of applications 1320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1340 may be a software implementation of a physical machine that runs programs as if they were executing on a physical, non-virtualized machine. Each of virtual machines 1340, and that part of hardware 1330 that executes that virtual machine, be it hardware dedicated to that virtual machine and/or hardware shared by that virtual machine with others of the virtual machines 1340, forms a separate virtual network elements (VNE).

Still in the context of NFV, Virtual Network Function (VNF) is responsible for handling specific network functions that run in one or more virtual machines 1340 on top of hardware networking infrastructure 1330 and corresponds to application 1320 in FIG. 13.

In some embodiments, one or more radio units 13200 that each include one or more transmitters 13220 and one or more receivers 13210 may be coupled to one or more antennas 13225. Radio units 13200 may communicate directly with hardware nodes 1330 via one or more appropriate network interfaces and may be used in combination with the virtual components to provide a virtual node with radio capabilities, such as a radio access node or a base station.

In some embodiments, some signalling can be effected with the use of control system 13230 which may alternatively be used for communication between the hardware nodes 1330 and radio units 13200.

In some embodiments a computer program, computer program product or computer readable storage medium comprises instructions which when executed on a computer perform any of the embodiments disclosed herein. In further examples the instructions are carried on a signal or carrier and which are executable on a computer wherein when executed perform any of the embodiments disclosed herein.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

At least some of the following abbreviations may be used in this disclosure. If there is an inconsistency between abbreviations, preference should be given to how it is used above. If listed multiple times below, the first listing should be preferred over any subsequent listing(s).

1×RTT CDMA2000 1× Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
FKP Flachen-Korrektur-Parameter (FKP) (area correction parameter)
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Master Auxiliary Concept
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network RAT Radio Access Technology
RLM Radio Link Management
RMS Root Mean Square
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
RTK Real Time Kinematics
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network

The invention claimed is:

1. A method performed by a wireless device, the method comprising:
sending, to a network node, a request for reference station transfer information;
obtaining the reference station transfer information for at least one pair of satellites; and
determining an integer ambiguity solution associated with a new reference station based on the obtained reference station transfer information and an integer ambiguity solution associated with a current reference station.

2. A method performed by a network node, the method comprising:
determining reference station transfer information for at least one pair of satellites associated with a current reference station of a wireless device and a new reference station of the wireless device; and
sending the determined reference station transfer information to the wireless device.

3. A wireless device, comprising:
a receiver;
a transmitter; and
processing circuitry coupled to the receiver and the transmitter, the processing circuitry configured to:
send, to a network node, a request for reference station transfer information;
obtain the reference station transfer information for at least one pair of satellites; and
determine an integer ambiguity solution associated with a new reference station based on the obtained reference station transfer information and an integer ambiguity solution associated with a current reference station.

4. The wireless device of claim 3, wherein the processing circuitry is configured to estimate a position of the wireless device based on the integer ambiguity solution associated with the new reference station and one or more carrier phase observations from the new reference station.

5. The wireless device of claim 3, wherein the processing circuitry is configured to send capability information to the network node, the capability information indicating a capability of the wireless device to use reference station transfer information.

6. The wireless device of claim 3, wherein the request for reference station transfer information comprises an identifier of the current reference station.

7. The wireless device of claim 3, wherein the request for reference station transfer information comprises an identifier of the new reference station.

8. The wireless device of claim 3, wherein the request for reference station transfer information is sent in response to a determination that the wireless device needs to change from the current reference station to the new reference station.

9. The wireless device of claim 3, wherein the request for reference station transfer information is included in a GNSS-RTK-ObservationsReq information element.

10. The wireless device of claim 3, wherein the obtained reference station transfer information comprises:
reference station transfer information for a first satellite signal of a first satellite in the satellite pair; and
reference station transfer information for a second satellite signal of a second satellite in the satellite pair.

11. The wireless device of claim 3, wherein the obtained reference station transfer information comprises reference station transfer information for one or more global navigation satellite systems.

12. The wireless device of claim 3, wherein the obtained reference station transfer information comprises a double difference of the integer ambiguity solution associated with the current reference station and the integer ambiguity solution associated with the new reference station.

13. The wireless device of claim 3, wherein the reference station transfer information is obtained from a GNSS-RTK-RStransferinfo information element.

14. The wireless device of claim 3, wherein the network node comprises a location server.

15. The wireless device of claim 3, wherein one or more of the current reference station and the new reference station is a virtual reference station.

16. A network node, comprising:
a receiver;
a transmitter; and
processing circuitry coupled to the receiver and the transmitter, the processing circuitry configured to:
determine reference station transfer information for at least one pair of satellites associated with a current reference station of a wireless device and a new reference station of the wireless device; and
send the determined reference station transfer information to the wireless device.

17. The network node of claim 16, wherein the processing circuitry is configured to:
receive a request for the reference station transfer information from the wireless device; and
wherein the reference station transfer information is determined in response to the request.

18. The network node of claim 17, wherein the request for the reference station transfer information comprises an identifier of the current reference station.

19. The network node of claim 17, wherein the request for the reference station transfer information comprises an identifier of the new reference station.

20. The network node of claim 17, wherein the request for the reference station transfer information is included in a GNSS-RTK-ObservationsReq information element.

21. The network node of claim 16, wherein the processing circuitry is configured to receive capability information for the wireless device, the capability information indicating a capability of the wireless device to use reference station transfer information.

22. The network node of claim 16, wherein the reference station transfer information comprises:
reference station transfer information for a first satellite signal of a first satellite in the satellite pair; and
reference station transfer information for a second satellite signal of a second satellite) in the satellite pair.

23. The network node of claim 16, wherein the reference station transfer information comprises reference station transfer information for one or more global navigation satellite systems.

24. The network node of claim 16, wherein the reference station transfer information comprises a double difference of an integer ambiguity solution associated with the current reference station and an integer ambiguity solution associated with the new reference station.

25. The network node of claim 24, wherein the reference station transfer information enables the wireless device to:
determine the integer ambiguity solution associated with the new reference station based on the reference station transfer information and the integer ambiguity solution associated with the current reference station; and
estimate a position of the wireless device based on the integer ambiguity solution associated with the new reference station and one or more carrier phase observations from the new reference station.

26. The network node of claim 16, wherein the reference station transfer information is sent in a GNSS-RTK-RStransferInfo information element.

* * * * *